United States Patent
Grieve

(10) Patent No.: US 9,718,014 B2
(45) Date of Patent: Aug. 1, 2017

(54) DEVICE AND METHOD FOR CLEANING BAG FILTERS

(71) Applicant: Dennis Grieve, Star, ID (US)

(72) Inventor: Dennis Grieve, Star, ID (US)

(73) Assignee: GITA GREEN, INC., Spencer, IA (US)

( * ) Notice: Subject to any disclaimer, the term of this patent is extended or adjusted under 35 U.S.C. 154(b) by 625 days.

(21) Appl. No.: 14/068,432

(22) Filed: Oct. 31, 2013

(65) Prior Publication Data

US 2014/0116471 A1 May 1, 2014

Related U.S. Application Data

(60) Provisional application No. 61/720,701, filed on Oct. 31, 2012.

(51) Int. Cl.
| | |
|---|---|
| B01D 41/04 | (2006.01) |
| B05B 1/00 | (2006.01) |
| B01D 46/00 | (2006.01) |
| B05B 3/06 | (2006.01) |
| B05B 13/06 | (2006.01) |
| B05B 15/00 | (2006.01) |
| B08B 11/02 | (2006.01) |
| B08B 9/00 | (2006.01) |
| B08B 3/02 | (2006.01) |
| B08B 3/04 | (2006.01) |
| B08B 5/02 | (2006.01) |

(52) U.S. Cl.
CPC ......... *B01D 41/04* (2013.01); *B01D 46/0068* (2013.01); *B05B 1/005* (2013.01); *B05B 3/06* (2013.01); *B05B 13/0636* (2013.01); *B05B 15/001* (2013.01); *B08B 9/00* (2013.01); *B08B 11/02* (2013.01); *B08B 3/02* (2013.01); *B08B 3/04* (2013.01); *B08B 5/02* (2013.01)

(58) Field of Classification Search
CPC .... B01D 46/0068; B01D 41/04; B05B 1/005; B05B 15/001; B05B 3/06; B05B 13/0636; B08B 11/02; B08B 9/00; B08B 3/02; B08B 3/04; B08B 5/02
See application file for complete search history.

(56) References Cited

U.S. PATENT DOCUMENTS

| | | | |
|---|---|---|---|
| 3,958,296 A | 5/1976 | Fell | |
| 5,038,809 A * | 8/1991 | Rodgers | B08B 3/02 134/111 |

(Continued)

FOREIGN PATENT DOCUMENTS

| | | |
|---|---|---|
| DE | 3920097 | 2/1990 |
| EP | 2027905 | 2/2009 |

*Primary Examiner* — Michael Barr
*Assistant Examiner* — Benjamin L Osterhout
(74) *Attorney, Agent, or Firm* — James Ray and Assocs; Alexander Pokot

(57) ABSTRACT

A device configured for cleaning bag filters with compressed air comprises a frame having a hollow interior defining a wall of the frame and openings formed through a thickness of the wall so that the hollow interior is in open communication with an environment external to the frame. A mounting member is configured to be releaseably or permanently attached to one end of the frame and is further configured to be releaseably or permanently attached to a member configured to pass air flow therethrough.

15 Claims, 21 Drawing Sheets

(56) References Cited

U.S. PATENT DOCUMENTS

| | | | |
|---|---|---|---|
| 5,078,763 A | 1/1992 | Blount-Gillette | |
| 5,182,832 A | 2/1993 | McMahon | |
| 5,228,993 A | 7/1993 | Drori | |
| 5,322,535 A * | 6/1994 | Simms | B01D 41/04 55/294 |
| 5,332,448 A * | 7/1994 | Phillips | B08B 5/02 134/104.3 |
| 5,345,648 A * | 9/1994 | Graves | B05C 17/02 15/230.11 |
| 6,588,057 B2 | 7/2003 | McMahon | |
| 7,815,701 B2 | 10/2010 | Grieve | |
| 7,828,963 B1 * | 11/2010 | Neibert | B01D 41/04 134/198 |
| 8,382,870 B2 * | 2/2013 | Troxell | B01D 46/0068 55/302 |
| 2002/0166578 A1 * | 11/2002 | Leblond | A46B 13/001 134/99.2 |
| 2005/0034601 A1 * | 2/2005 | Stuckey | B01D 41/04 95/281 |
| 2005/0210842 A1 * | 9/2005 | McCausland | B01D 46/0068 55/302 |
| 2006/0230936 A1 * | 10/2006 | Jensen | B01D 46/04 95/280 |
| 2006/0243309 A1 * | 11/2006 | Prescott | B01D 41/04 134/33 |
| 2006/0283158 A1 * | 12/2006 | Kennedy | A47L 9/20 55/300 |
| 2013/0037061 A1 | 2/2013 | Grieve | |
| 2013/0298145 A1 * | 11/2013 | Tagami | G11B 17/225 720/615 |

* cited by examiner

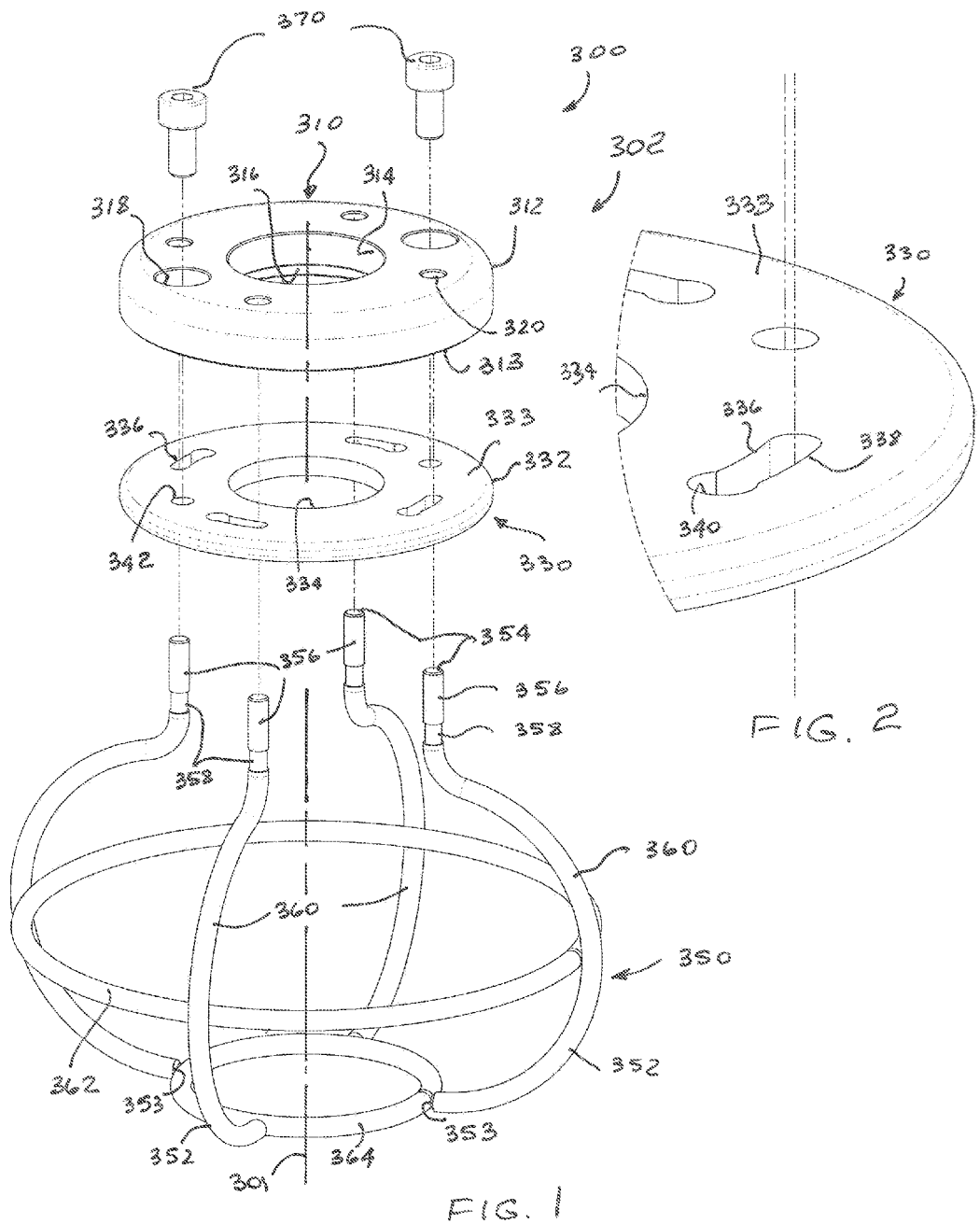

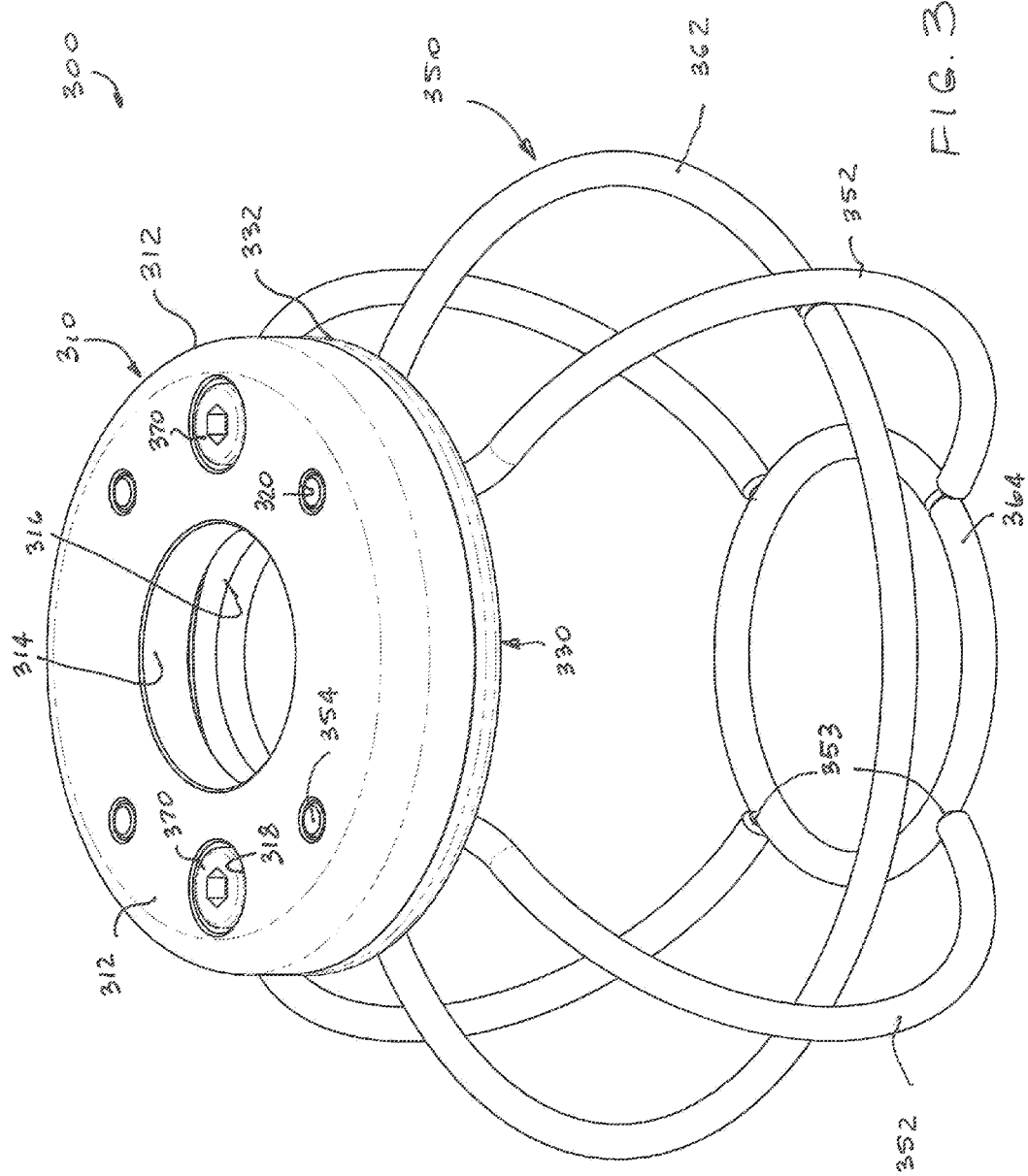

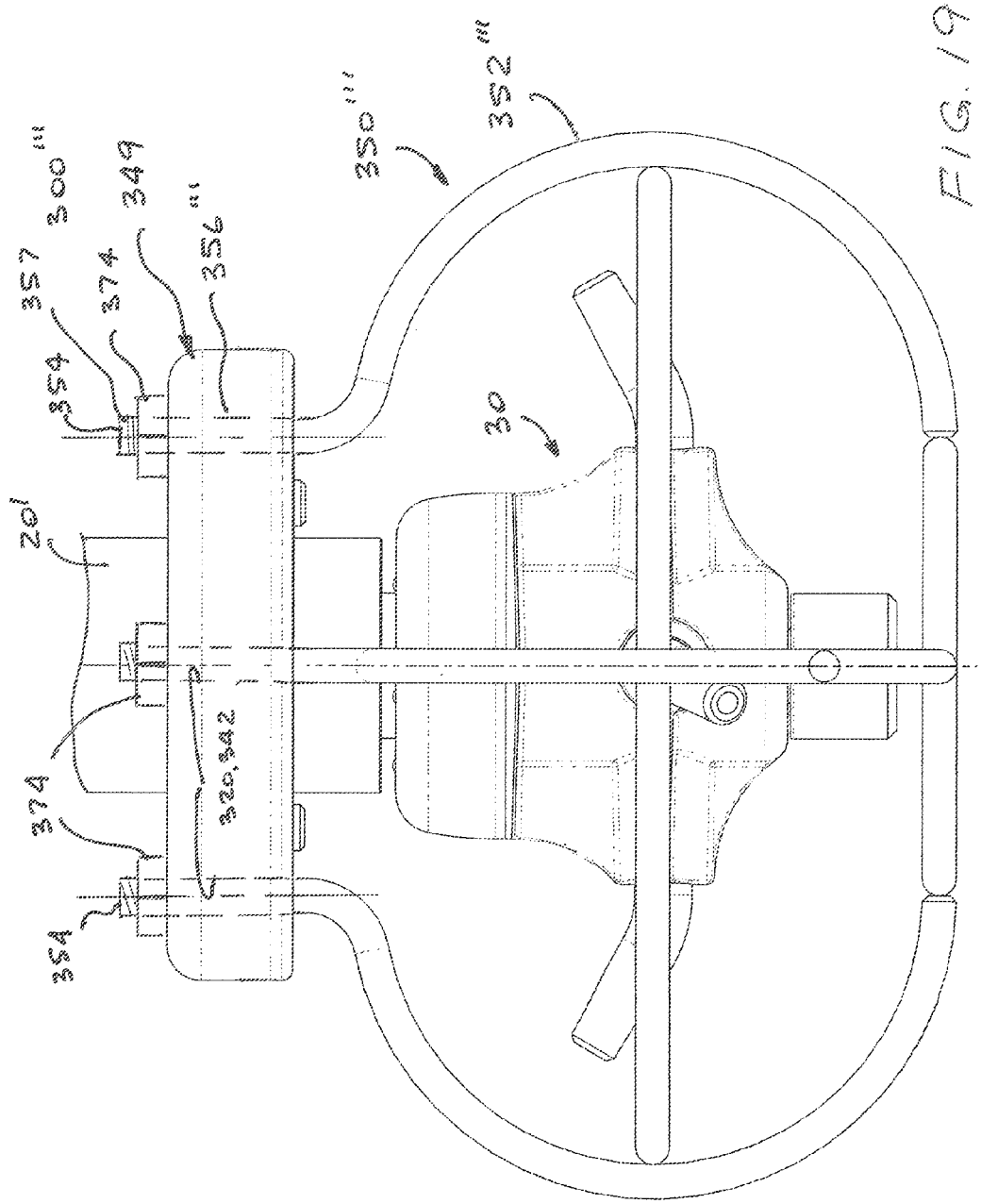

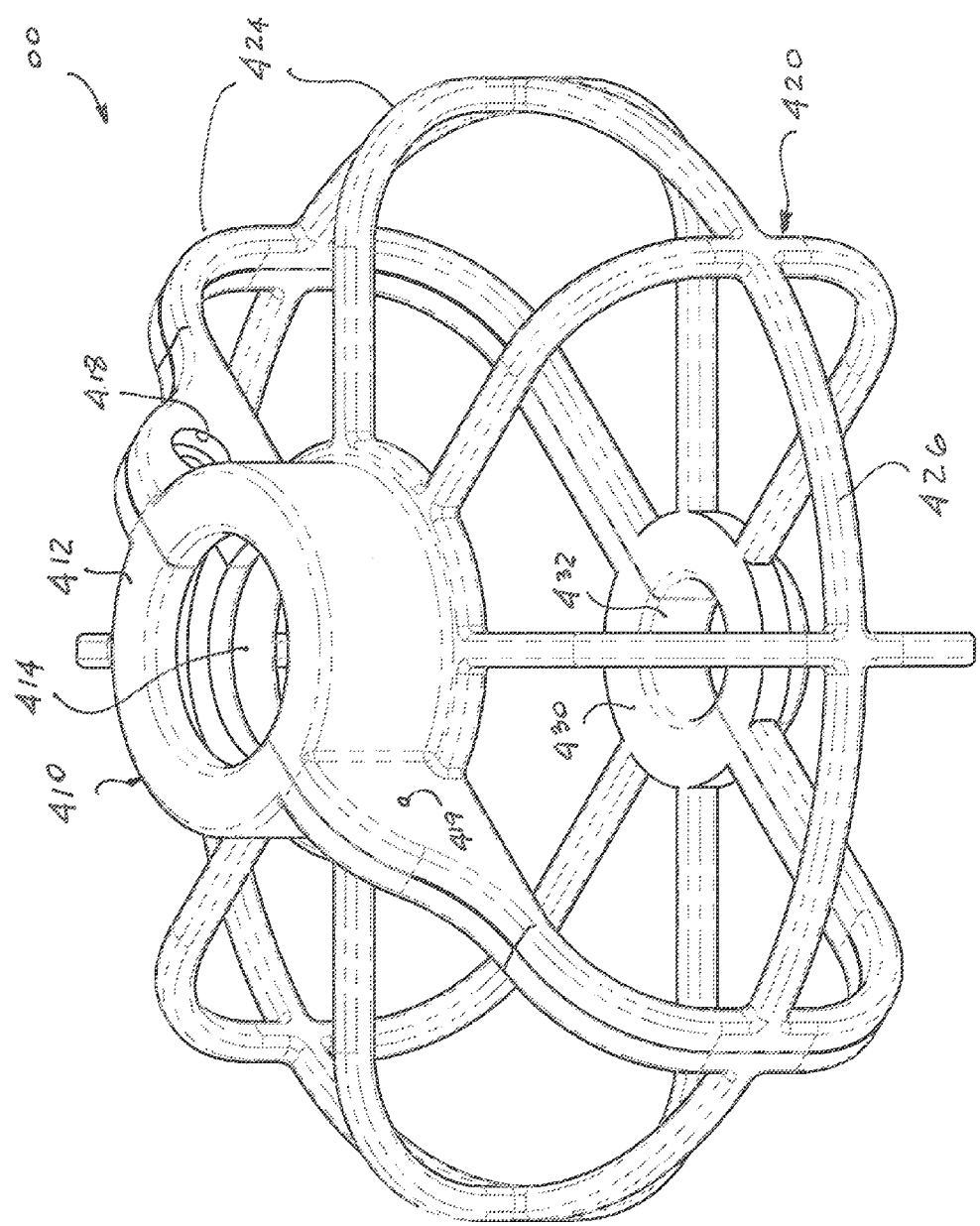

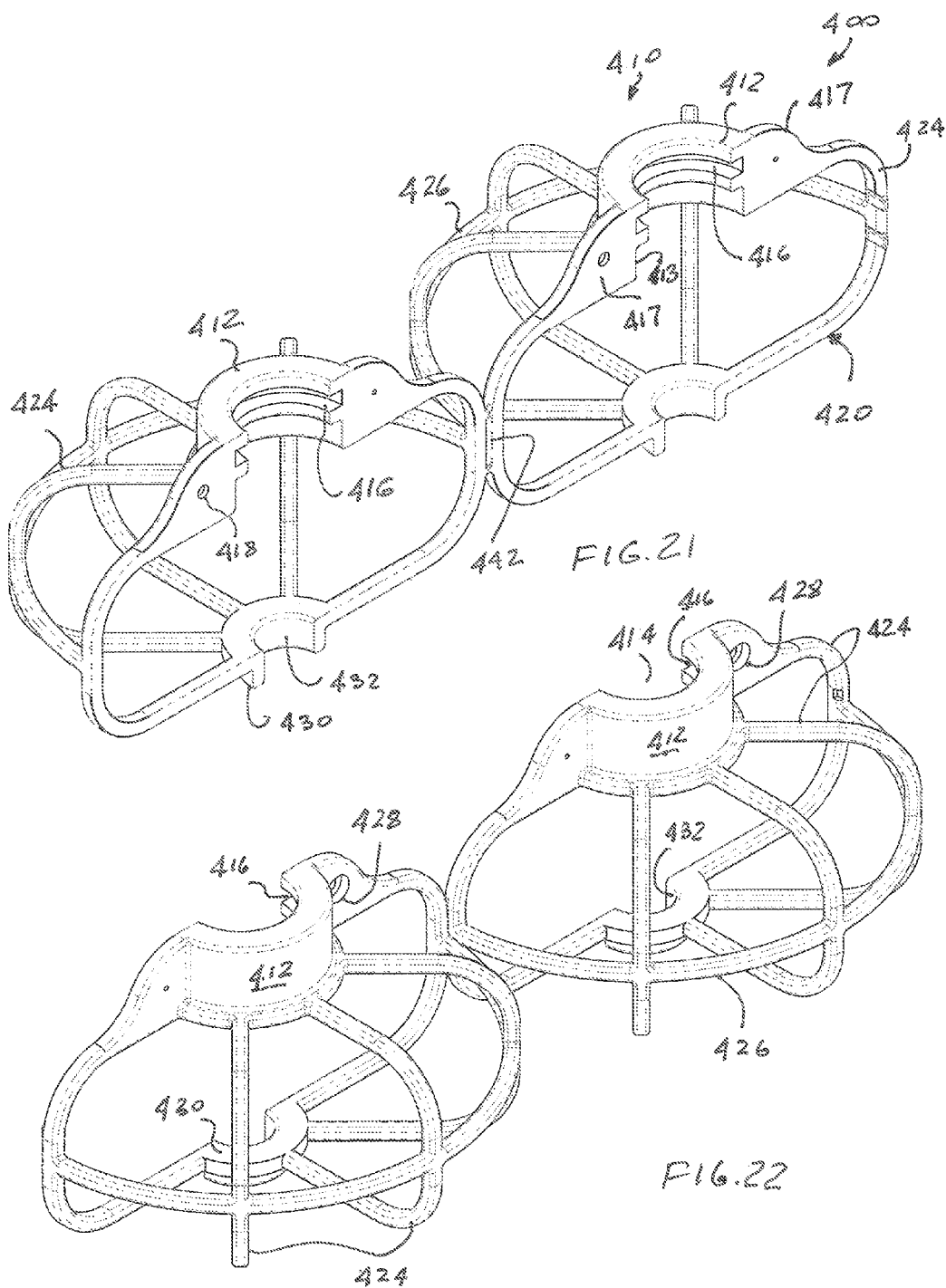

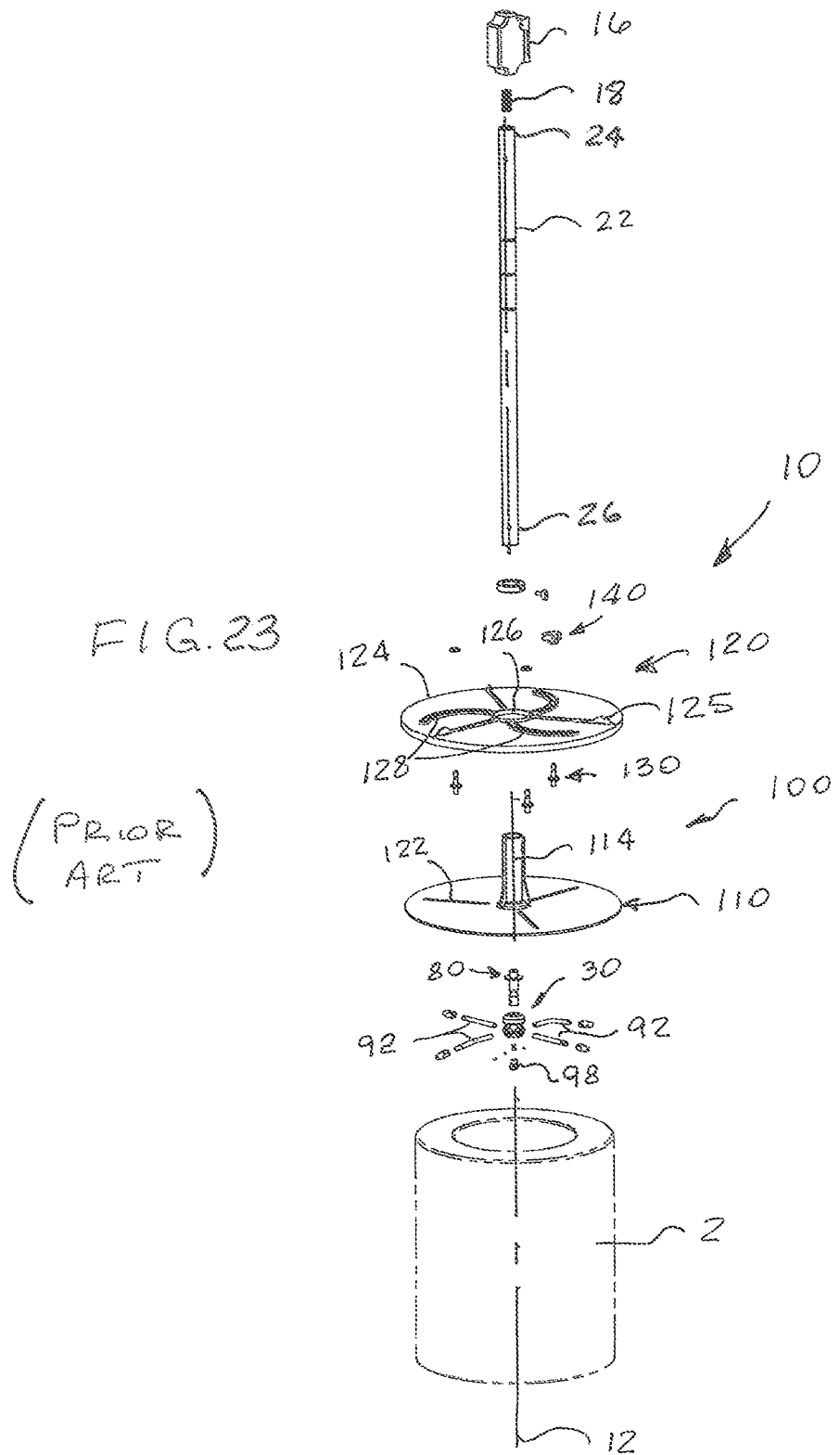

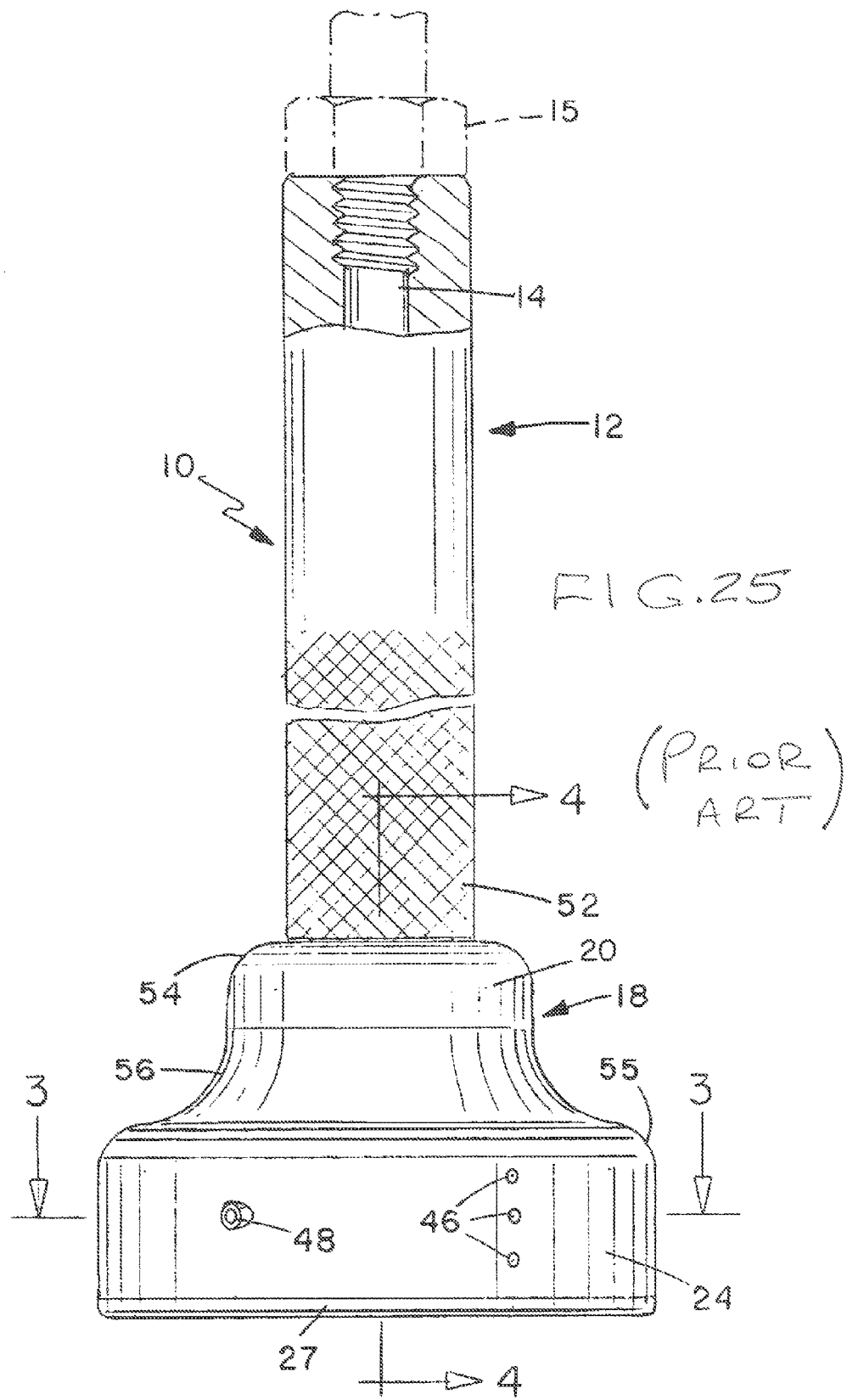

DEVICE AND METHOD FOR CLEANING BAG FILTERS

CROSS-REFERENCE TO RELATED APPLICATIONS

This application is related to and claims priority from U.S. Provisional Patent Application Ser. No. 61/720,701 filed on Oct. 31, 2012.

FIELD OF THE INVENTION

The present invention relates, in general, to bag air filters and, more particularly, this invention relates to a device and a method for cleaning bag filters and, yet more particularly, the instant invention relates to a device and a method for cleaning bag filters that employ a frame or cage configured for insertion into the bag filter and is further configured to be attached to a cleaning apparatus operable to supply fluid flow.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

As is generally well known, bag type filter includes a flexible filter media, for example such as a foam or even a knitted material. The bag filter is an elongated cylindrical member and is available in length of about two (2) feet to about ten (10) feet or longer. Due to its shape, it is often referred to as a "sock filter". The bag filter defines one closed end and an opposite open end. The open end is generally secured to an intake or exhaust port of an apparatus, for example such as a carburetor so that the bag acts like a filter. Prior to the conception and design of the instant invention, cleaning of the bag filter was done by simply inserting one end of the an air or a water hose into the filter, washing the filter in the washing machine or even twisting the bag filter, as is taught in U.S. Pat. No. 3,513,639.

However, there is a need for an improved device and method for cleaning bag type filters.

SUMMARY OF THE INVENTION

In accordance with one embodiment, the invention provides a device configured for cleaning bag filters with compressed air. The device include a frame having a hollow interior defining a wall of the frame and openings formed through a thickness of the wall so that the hollow interior is in open communication with an environment external to the frame. The device also includes a mounting member being configured to be releaseably or permanently attached to one end of the frame and is further configured to be releaseably or permanently attached to an apparatus having a rotating nozzle assembly delivering fluid flow onto the interior surface of the bag filter. The frame or cage is configured for insertion into the bag filter and is further configured to separate the inner surface of the bag filter from the nozzle end.

In another embodiment, the invention comprises a member including a hollow tubular member having an external thread on one end thereof and a nozzle assembly threadably connected to the one end of the hollow tubular member and mounted for a rotation about axis thereof, the nozzle assembly having a hollow interior in communication with an interior of the hollow tubular member and defining a peripheral flange disposed normal to the axis, wherein the mounting member is configured to cage the peripheral flange and is further configured to be releaseably or permanently attached to a frame having the nozzle assembly disposed within a hollow interior thereof.

In a further embodiment, the invention provides a device comprising a hollow tubular member having an external thread on one end thereof. A nozzle assembly is threadably connected to the one end of the hollow tubular member and is mounted for a rotation about axis thereof. The nozzle assembly has a hollow interior in communication with an interior of the hollow tubular member and defining a peripheral flange disposed normal to the axis. A frame is provided and has a hollow interior defining a wall of the frame and apertures or openings formed through a thickness of the wall so that the hollow interior of the frame is in open communication with an environment external to the frame, wherein the rotating nozzle assembly is positioned within the hollow interior of the frame. A mounting member is configured to cage the peripheral flange on or about a surface of the hollow tubular member and is further configured to be releaseably or permanently attached to the frame.

In yet another embodiment, the invention provides a mounting member either releaseably or permanently attached to an exterior surface of an elongated member and having apertures formed through a thickness thereof; a frame having a hollow interior, openings formed through a wall thickness thereof so as to positioned the hollow interior in open communication with an external environment and straight portions adapted with barbs so as to frictionally engage apertures in the mounting member; and a rotating nozzle assembly mounted within the hollow interior of the frame and in fluid communication with a hollow interior of the elongated member so as to deliver fluid flow into the external environment.

In a further embodiments, the invention provides a mounting member either releaseably or permanently attached to an exterior surface of an elongated member and having apertures formed through a thickness thereof and a frame having a hollow interior, openings formed through a wall thickness thereof so as to positioned the hollow interior in open communication with an external environment and straight portions adapted with external threads so as to pass through apertures in the mounting member for engagement with threaded fasteners; and a rotating nozzle assembly mounted within the hollow interior of the frame and in fluid communication with a hollow interior of the elongated member so as to deliver fluid flow into the external environment.

In yet a further embodiment, the invention provides a mounting member either releaseably or permanently attached to an exterior surface of an elongated member and having curved slots formed through a thickness thereof; a frame having a hollow interior, openings formed through a wall thickness thereof so as to positioned the hollow interior in open communication with an external environment and straight portions adapted with grooves so as to interlock with the slots in the mounting member; and a rotating nozzle assembly mounted within the hollow interior of the frame and in fluid communication with a hollow interior of the elongated member so as to deliver fluid flow into the external environment.

OBJECTS OF THE INVENTION

It is, therefore, one of the primary objects of the present invention to provide a device for cleaning bag type filters.

Another object of the present invention is to provide a device for cleaning bag type filters that includes a frame or cage configured for insertion into the bag filter and is further configured to be attached to an apparatus having a rotating nozzle assembly delivering fluid flow onto an interior surface of the bag filter.

A further object of the present invention is to provide a device for cleaning bag type filters that includes a frame or cage configured for insertion into the bag filter and a mounting member configured to attach the frame or cage to an apparatus having a rotating nozzle assembly delivering fluid flow onto an interior surface of the bag filter.

Yet another object of the present invention is to provide a device for cleaning bag type filters that can be easily attached onto cleaning apparatuses presently in use.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 1 is an exploded 3-D isometric view of a device for cleaning bag type filters;
FIG. 2 is a partial enlarged view of the device of FIG. 1;
FIG. 3 is a 3-D isometric view of the device of FIG. 1;
FIG. 19 is an elevation view of the device of FIG. 3, constructed in accordance with a further form of the invention;
FIG. 20 is a 3-D isometric view of another embodiment of a device for cleaning bag type filters;
FIG. 21 is a front 3-D isometric view of the device of FIG. 20;
FIG. 22 is a rear 3-D isometric view of the device of FIG. 20;
FIG. 23 is an exploded 3-D isometric view of a presently preferred prior art apparatus to be employed in combination with the devices of FIGS. 1-22;
FIG. 25 is an elevation view of another prior art apparatus to be employed in combination with the devices of FIGS. 1-22.

BRIEF DESCRIPTION OF THE VARIOUS EMBODIMENTS OF THE INVENTION

Figure 4:
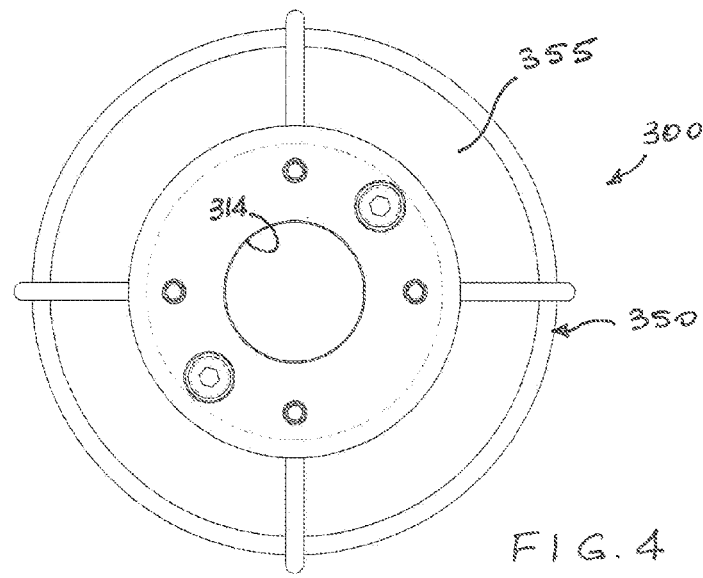
FIG. 4 is a top plan view of the device of FIG. 3.
Figure 5:
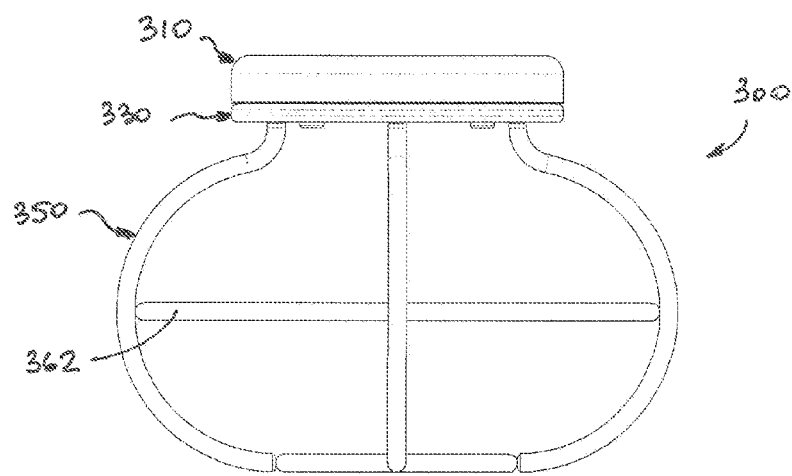
FIG. 5 is a front, rear or side elevation view of the device of FIG. 3.
Figure 6:
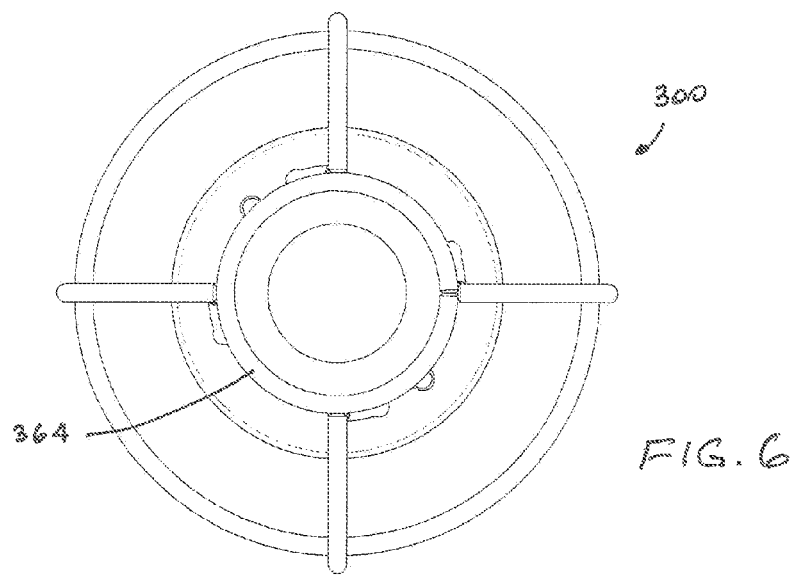
FIG. 6 is a bottom plan view of the device of FIG. 3.

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a bag filter applies to a cylinder or a bulb shaped flexible filter with one closed end and an opposite open end.

The instant invention is illustrated and described in combination with an apparatus for as disclosed in U.S. patent application Ser. No. 13/602,424 filed on Sep. 4, 2012 and published as US Pub. No. 2013/0037061 A1 on Feb. 14, 2013, although it will be apparent to those skilled in the relevant art that the present invention may be applied to other devices for cleaning air filters, for example as illustrated in FIG. 25, and as such should not be interpreted as a limiting factor of the instant invention.

For the sake of reader's convenience, a brief description of the apparatus 10 in U.S. patent application Ser. No. 13/602,424 is as follows.

Figure 24:
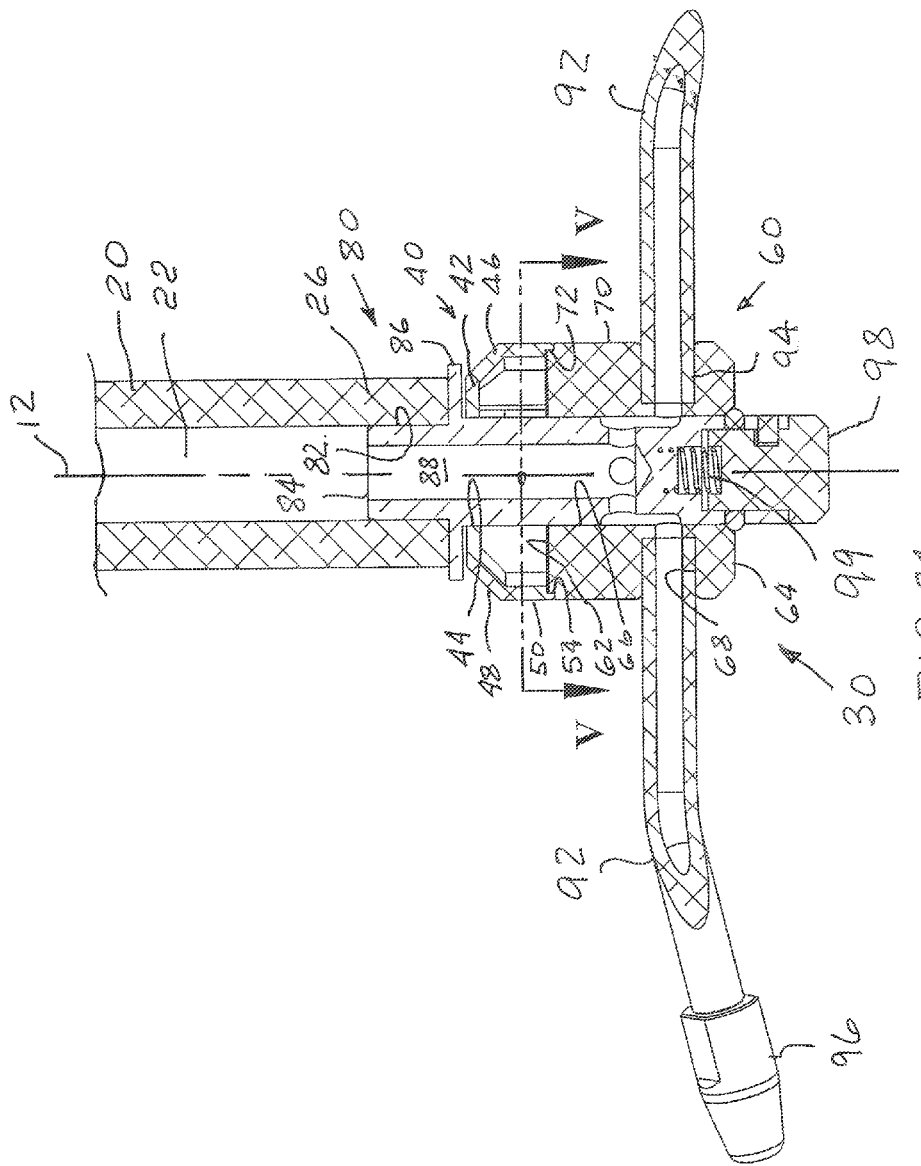
FIG. 24 is a partial elevation view of the apparatus of FIG. 23.

Reference is now made to FIGS. 23-24, wherein the apparatus 10 includes a member 20 having a hollow interior 22 and adapted for communicating a flow of pressurized fluid therethrough. For the sake of reader's convenience, FIGS. 23 and 24 are essentially the same as FIGS. 1 and 4 respectively in the U.S. patent application Ser. No. 13/602,424, whose teachings are incorporated into this document by reference thereto. Preferably, such member 20 is an elongated rigid tubular member manufactured from a lightweight material, such as aluminum. The member 20 defines a longitudinal axis 12 of the apparatus 10 and has a pair of ends 24 and 26 spaced apart from each other along the longitudinal axis 12. During operation, one end 24 of the elongated member 20 is connected to a source of fluid under pressure (not shown), preferably regulated by a conventional trigger 16 attached to the member 20 with a threaded member 18 or any other devices operable to selectively supply and discontinue supply of the fluid under pressure. Preferably, such fluid under pressure is compressed air. The member 20 may be of a flexible type, such as a hose.

Another essential element of the apparatus 10 is a body, generally designated as 30. The body 30 is disposed at an axially opposite end of the member 20, referenced with numeral 26 in FIGS. 23-24. The body 30 is being comprised of two body portion. The first body portion, generally designated as 40, is disposed at the axially opposite end 26 of the first elongated rigid member 20. The first body portion 40 includes a base 42 having a pair of spaced apart generally planar surfaces defining thickness of the base 42 and being disposed generally normal to the longitudinal axis 12 of the apparatus 10. A central aperture 44 is formed through the thickness of the base 42. There is also a peripheral wall 46 that depends from the base 42. The peripheral wall 46 has a frustoconical wall portion 48 disposed next to the base 42 and a generally cylindrical wall portion 50 extending from the frustoconical wall portion 48. A first peripheral notch 54 is formed on an inner surface 52 of the generally cylindrical wall portion 50 adjacent distal end of the peripheral wall 46. The base 42 and the peripheral wall 46 define in combination a hollow interior 56 of the first body portion 40.

The second body portion, generally designated as 60, is disposed axially with the first body portion 40. The second body portion 60 includes a pair of axial ends 62 and 64 spaced apart along the longitudinal axis 12 and defining length of the second body portion 60. A first axial bore 66 is formed through the length of the second body portion 60 and is provided in fluid communication with a hollow interior 22 of the first elongated member 20. At least one and, preferably, a plurality of ports 68 are formed through a wall thickness of the second body portion 60 and are disposed in a radial spaced-apart pattern in a plane being normal to the longitudinal axis 12. The at least one port 68 is provided in fluid communication with the first axial bore 66 and communicates pressurized fluid flow external to the second body portion 60 when the pressurized fluid flows through the hollow interior 22. There is also a second peripheral notch 72 being disposed on an outer surface 70 of the second body portion 60 adjacent the axial end 62 thereof being disposed adjacent the distal end of the peripheral wall 46 of the first body portion 40. The second peripheral notch 72 is sized to operatively mate with the first peripheral notch 54 so as to rigidly and sealingly secure the second body portion 60 to the first body portion 40, for example by way of a adhesive (not shown) or any other conventional means. Although the body 30 has been illustrated in FIG. 24 as being manufactured from separate first body portion 40 and second body portion 60, the instant invention contemplates that such body 30 can be manufactured as a single-piece unitary member.

Advantageously, the hollow interior 56 defines a closed chamber when the first body portion 40 is rigidly and sealingly secured to the second body portion 60. It is presently preferred that the at least one port 68 is provided so as to enable proper rotation of the body 30. A second elongated member, generally designated as 80, is provided so as to operatively mount the body 30 at the axial end 26 of the first elongated member 20. The second elongated member 80 includes a peripheral surface 82 being so sized that a first axial end 84 of the second elongated member 80 is rigidly secured within the hollow interior 22 of the first elongated member 20. A radial generally planar flange 86 upstands on the peripheral surface 82 of the second elongated member 80 and has one surface thereof positioned in direct contact with the axially opposite end 26 of the first elongated rigid member 20. A second axial bore 88 is formed through a length of the second elongated member 80 in fluid communication with the hollow interior 22 of the first elongated member 20 and each of the plurality of ports 68. Thus, the second elongated member 80 is also a generally hollow member. At least one and preferably a pair of orifices are formed through a wall of the second elongated member 80 generally normal to the longitudinal axis 12 and in fluid communication with the second axial bore 88 and the closed chamber 56. Furthermore, the central aperture 44 of the first body portion 40 and the first axial bore 68 of the second body portion 60 are being so sized that the first and second body portions, 40 and 60 respectively, rotate on the peripheral surface 82 of the second elongated member 80 when the pressurized fluid flow is communicated through the hollow interior 22 of the first elongated member 20. Preferably, the second elongated member 80 is manufactured from a friction reducing material, for example such as brass, so as to provide a bearing-like surface and facilitate the rotation of the body 30. Although it is also contemplated to manufacture the second elongated member 80 from other materials and either coat its peripheral surface 82 with friction reducing materials or mount a bearing bushing (not shown) on the peripheral surface 82.

There is also provided at least one and preferably a plurality of optional elongated nozzles 92, each of the plurality of elongated nozzles 92 having a proximal end 94 thereof detachably attached in fluid communication to a respective one of the plurality of ports 68 and having a distal end 96 thereof extending a predetermined distance from the outer surface of the second body portion 60 so as to communicate the pressurized fluid flow external thereto.

The instant invention provides a device configured to clean bag type filters. The device comprises a frame or a cage having a hollow interior defining a wall of said frame and apertures or openings formed through a thickness of the wall so that the hollow interior is in open communication with an environment external to the frame or cage. The device further comprises a mounting member configured to be releaseably or permanently attached to one end of the frame or cage and is further configured to be releaseably or permanently attached to another member.

Now in reference to FIGS. 1-8, therein is illustrated a device, generally designated as 300, constructed in accordance with a presently preferred embodiment of the invention and that can be used with the apparatus 10. The device 300 includes a mounting member, generally designated as 302, and a frame or cage, generally designated as 350.

The mounting member 302 is comprised of a first disk shaped member, generally designated as 310, and a second disk shaped member, generally designated as 330.

The first disk shaped member 302 defines a body 312 having a first aperture 314 formed through a thickness thereof and having an axis thereof aligned with a longitudinal axis 301 of the device 300. There is a pair of diametrically opposite second apertures 318 formed through the thickness, each positioned in a region between an edge of the first aperture 314 and a peripheral edge of the first disk shaped member 310. There is also a plurality of third apertures 320 formed through the thickness of the body 312 in a spaced apart relationship with each other, each positioned in the region between the edge of the first aperture 314 and the peripheral edge of the first disk shaped member 310. Finally, the first disk shaped member 310 includes a bore 316 formed in a surface 313 thereof coaxially with the first aperture 314.

The second disk shaped member 330 is defined by a body 332 and has a surface 333 thereof positioned in a direct abutting contact with the surface 313 of the first disk shaped member 310. There is a first aperture 334 being formed through a thickness of the second disk shaped member 330 and having an axis thereof aligned with the longitudinal axis 301 of the device 300. Two threaded second apertures 342 are formed through the thickness of the second disk shaped member 330 and are aligned with the pair of second apertures 318 formed through the thickness of the first disk shaped member 310, whereby a pair of threaded fasteners 370 passed through the second apertures 318 of the first disk shaped member 310 and threadably engaging the second apertures 342 of the second disk shaped member 330 releaseably fasten the second disk shaped member 330 to the first disk shaped member 310. There is a plurality of curved slots 336, best illustrated in FIG. 2, being formed through the thickness of the second disk shaped member 330, each defined by an arcuate and elongated portion 338 and having an enlarged end 340 aligned with a respective third aperture 320 of the first disk shaped member 310 when the second disk shaped member 330 is releaseably fastened to the first disk shaped member 310.

The frame or cage 350 includes a plurality of members 352, each member 352 including a first end 353 joined to a first end 353 of remaining members 352, a free second end 354, a straight end portion 356 disposed at a distance from and parallel to the longitudinal axis 301 of the device 300, the straight end portion 356 terminating in the free second end 354, a groove 358 of a reduced diameter or width, formed in the straight end portion 356 proximal to the free second end 354, and a curved portion 360 extending from the straight portion 356 and terminating in the first end 353 of each member 352, wherein all straight portions 356 are configured to interlock with the mounting member 302 so that the mounting member 302 is releaseably attached to the frame or cage 350. Members 352, being of a rod or wire type, essentially define apertures or openings 355 in the wall of the frame or cage 350, wherein the wall thickness is defined by the thickness or diameter of the members 352. The frame or cage 350 may further include an optional brace 362 joining all curved portions 360 of the plurality of members 352, whereby the all curved portions 360 define a spherical or curved shape of the frame 350. The frame or cage 350 may further include an optional ring shaped member 364 attached directly to all first ends 353 of the plurality of members 352.

The assembled device 330 is best shown in FIGS. 3-8.

Figure 7:
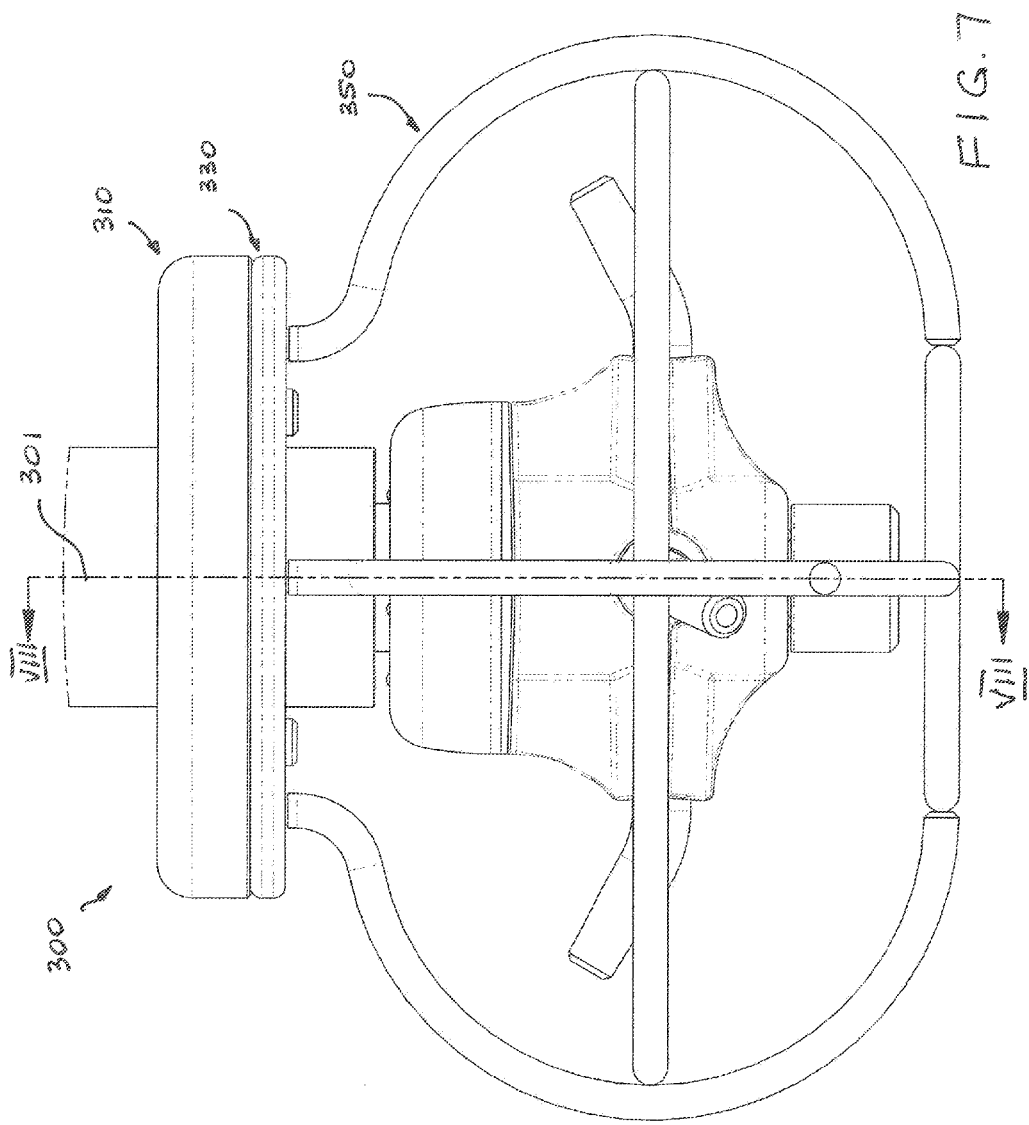
FIG. 7 is an elevation view of the device of FIG. 3, particularly illustrating a rotating body of FIGS. 23-24 and constructed in accordance with a presently preferred form of the invention.
Figure 8:
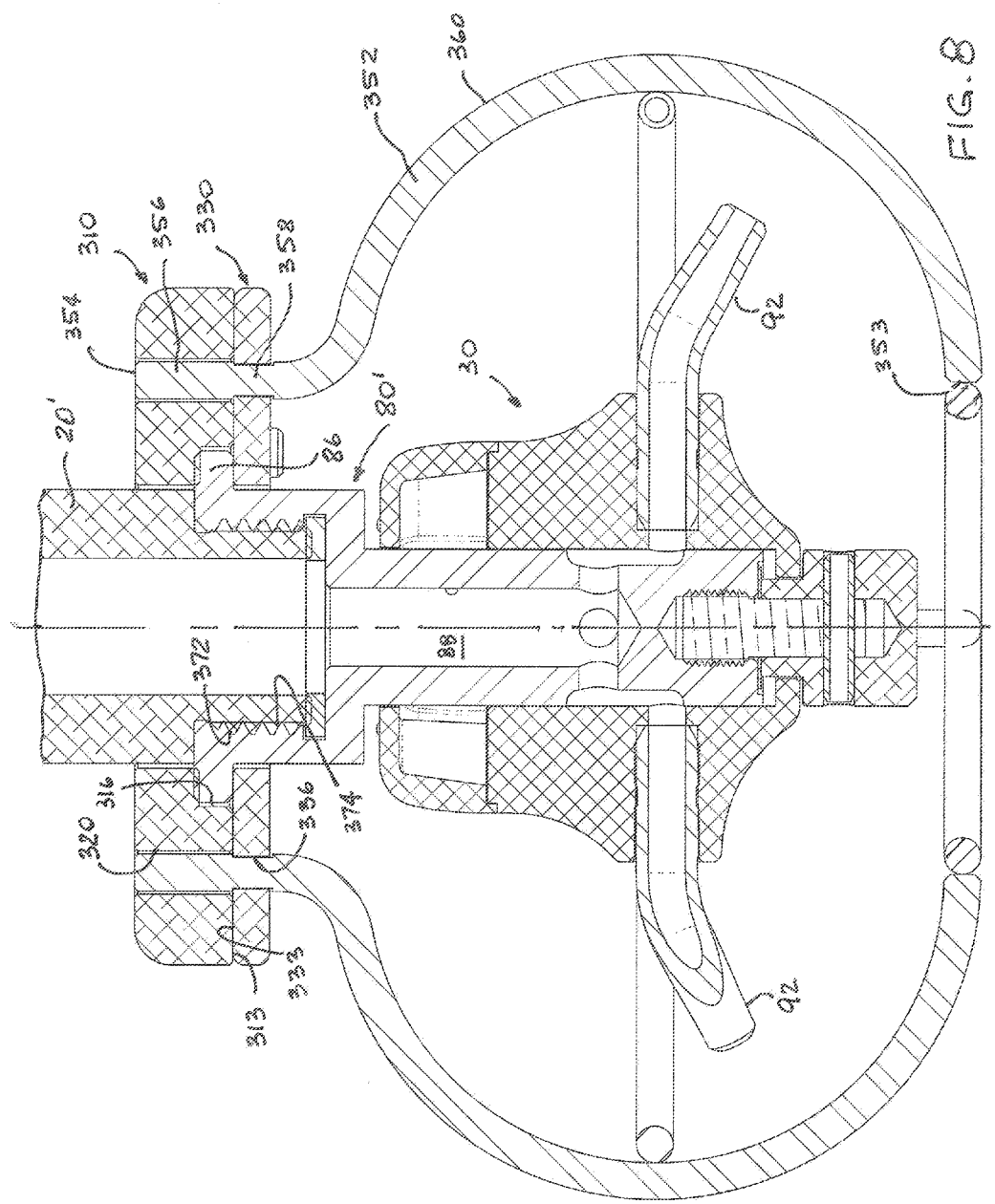
FIG. 8 is a cross-sectional elevation view of the device of FIG. 7 along lines VIII-VIII.

Now in a particular reference to FIGS. 7-8, the device 300 is illustrated as being installed onto the apparatus 10 essentially of the construction shown in FIGS. 23-34, except that one end of the first elongated member 20' has been adapted with an external thread 372 and the second elongated member 80' has been adapted with an internal complimentary thread 374 for attachment to the first elongated member 20'. However, the instant invention contemplates that the attachment of the second elongated member 80 to the first elongated member 20 disclosed in U.S. patent application Ser. No. 13/602,424 applies herewithin.

As is best shown in FIG. 8, the bore 316 is sized and shaped to receive the peripheral flange 86 of the second elongated member 80' and is configured and sized to cage the peripheral flange 86 of the second elongated member 80' when the second disk shaped member 330 is fastened to the first disk shaped member 310 with fasteners 370, whereby the device 300 is being releaseably attached to the apparatus 10, or any other suitable members configured for delivering fluid flow onto an interior surface of the bag type filter (not shown).

The assembly method of the presently preferred embodiment of FIGS. 1-8 is illustrated in FIGS. 9-14.

Figure 9:
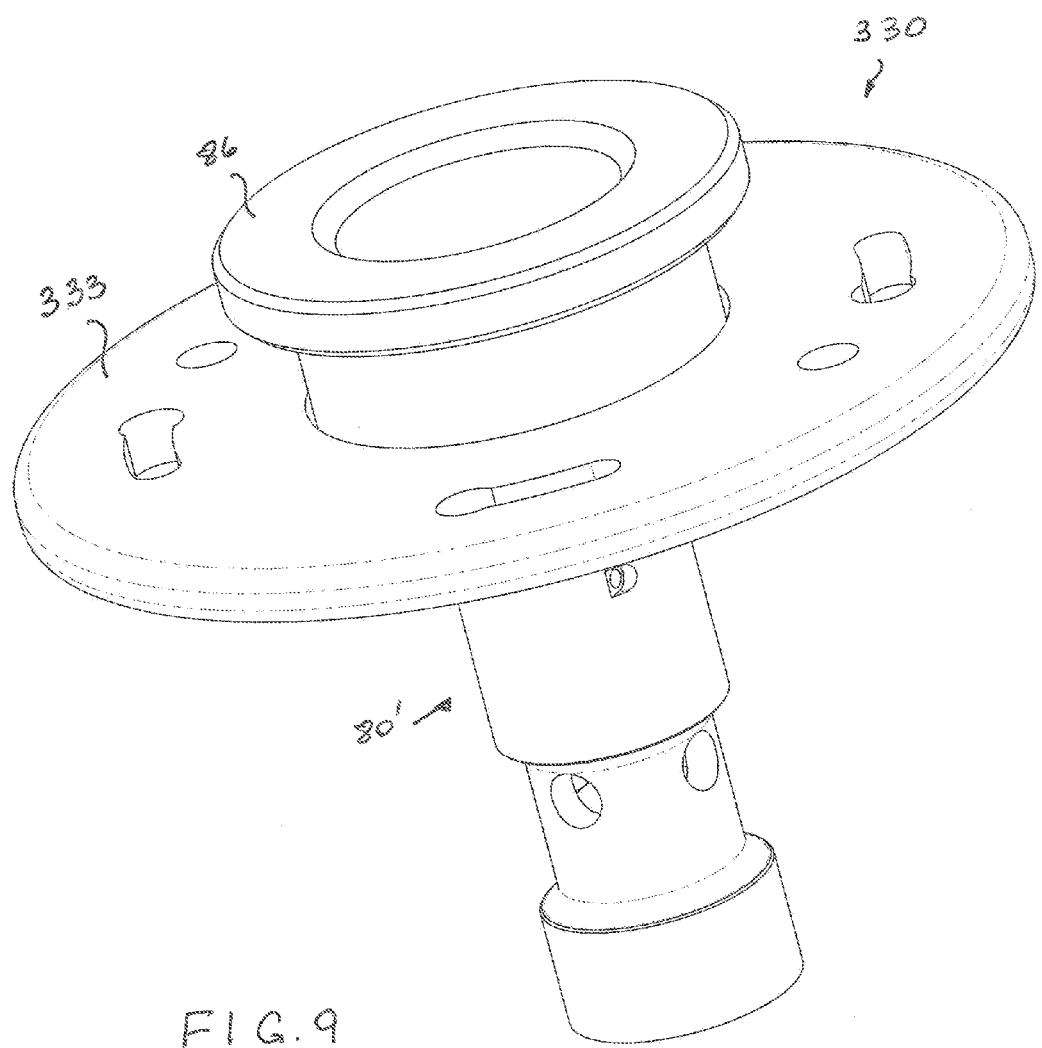
FIG. 9 is a partial 3-D isometric view of the device of FIGS. 7-8, particularly illustrating a first assembly step.
Figure 10:
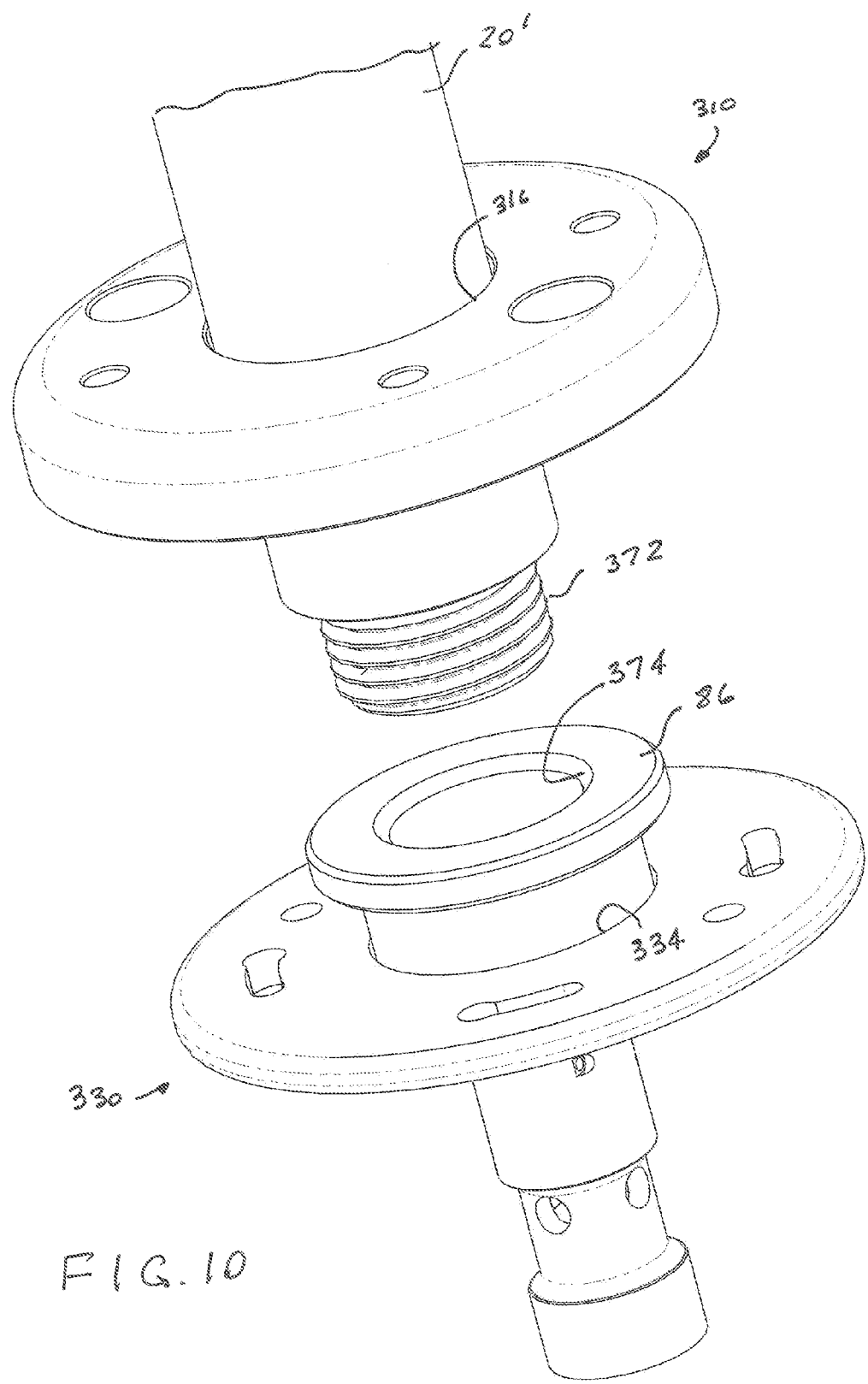
FIG. 10 is a partial 3-D isometric view of the device of FIGS. 7-8, particularly illustrating a second assembly step.
Figure 11:
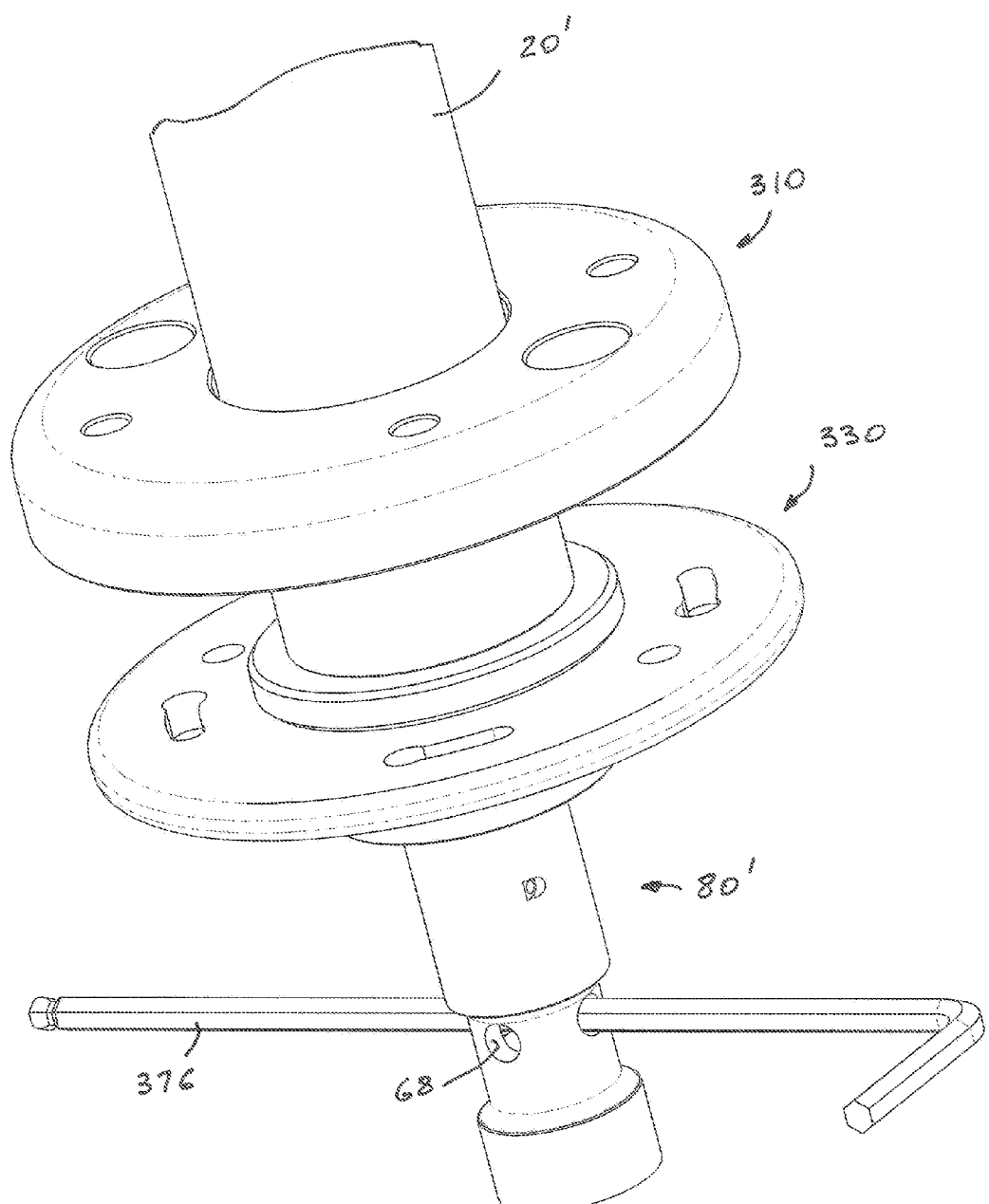
FIG. 11 is a partial 3-D isometric view of the device of FIGS. 7-8, particularly illustrating a third assembly step.
Figure 12:
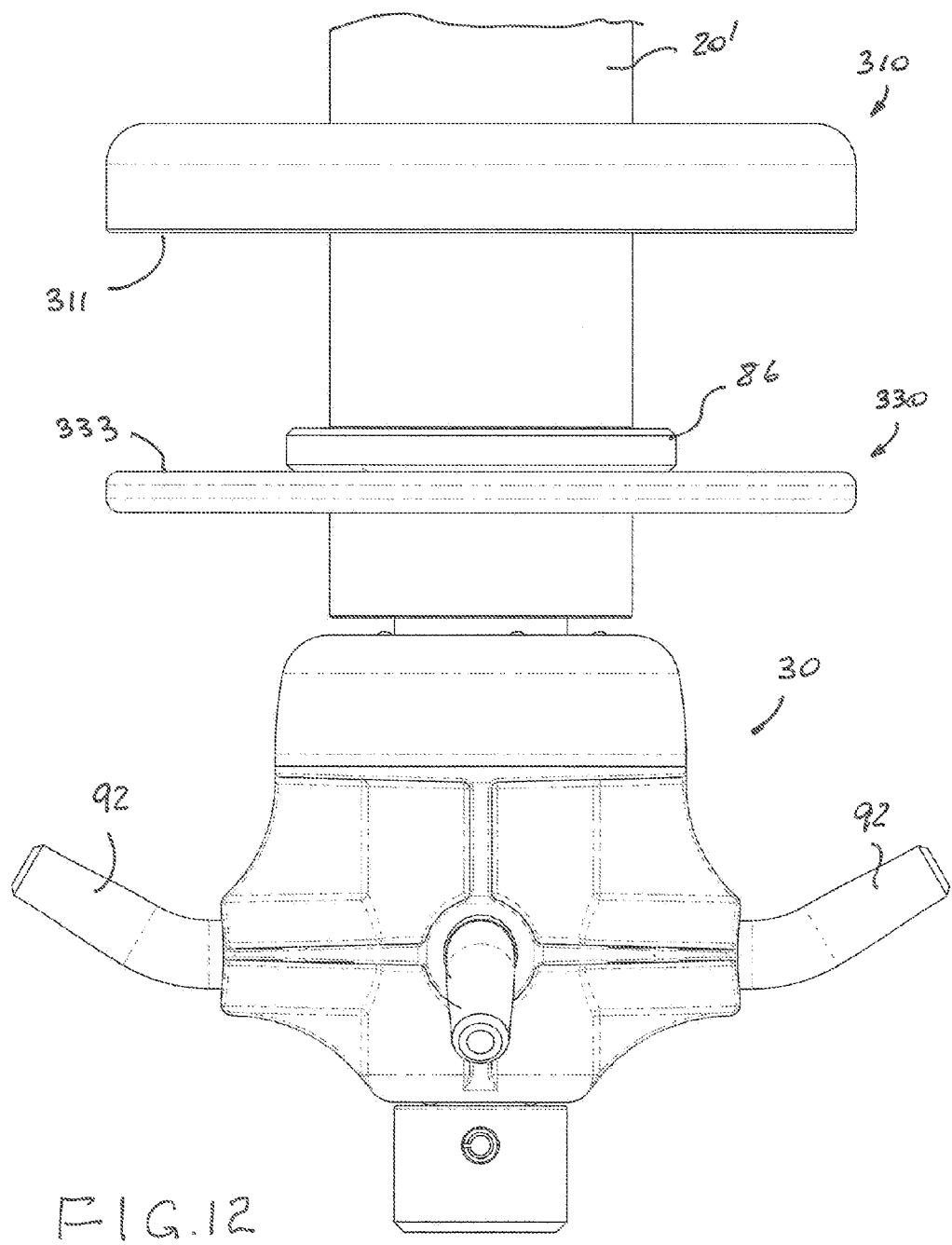
FIG. 12 is a partial 3-D isometric view of the device of FIGS. 7-8, particularly illustrating a fourth assembly step.
Figure 13:
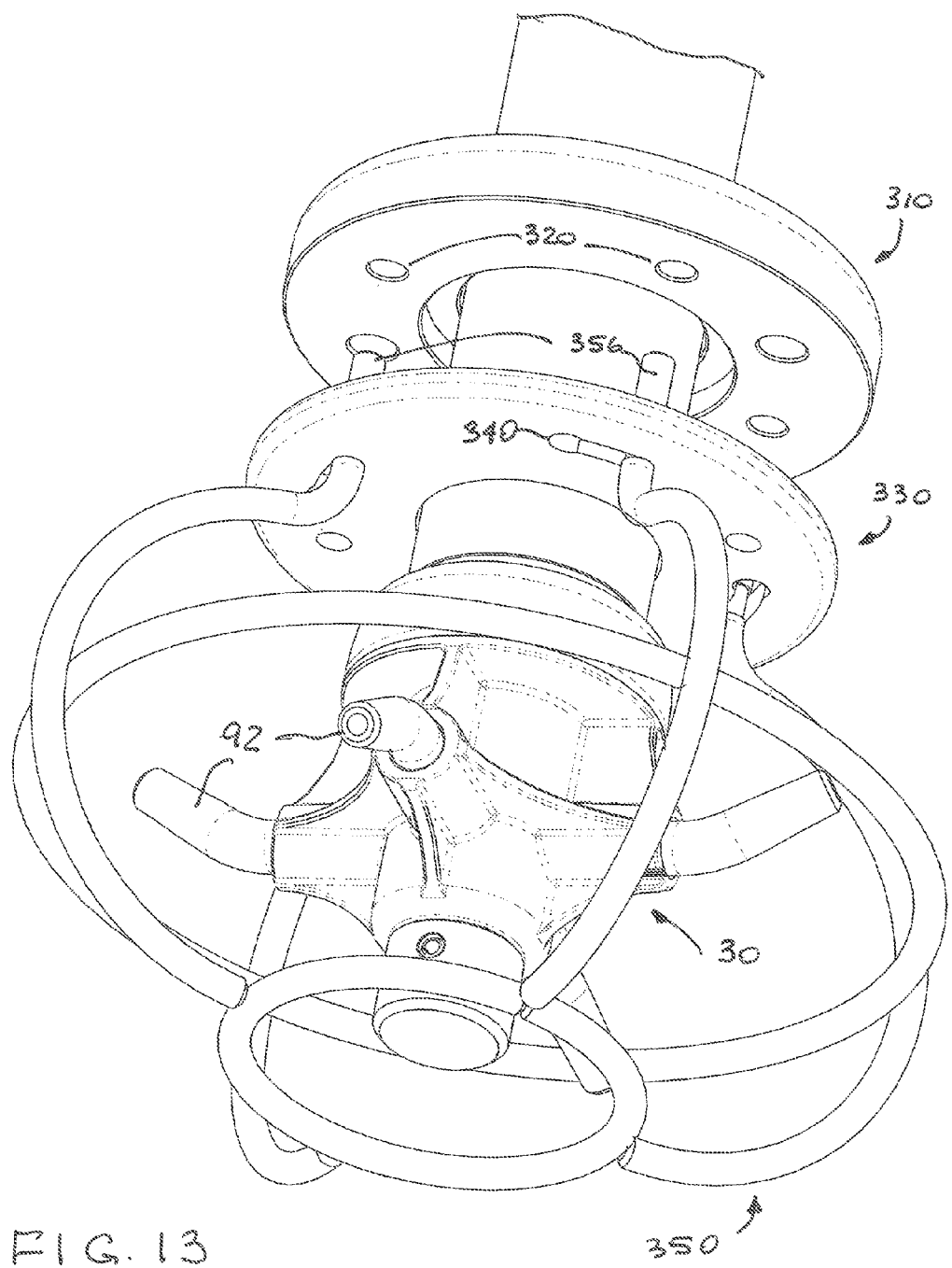
FIG. 13 is a 3-D isometric view of the device of FIGS. 7-8, particularly illustrating a fifth assembly step.
Figure 14:
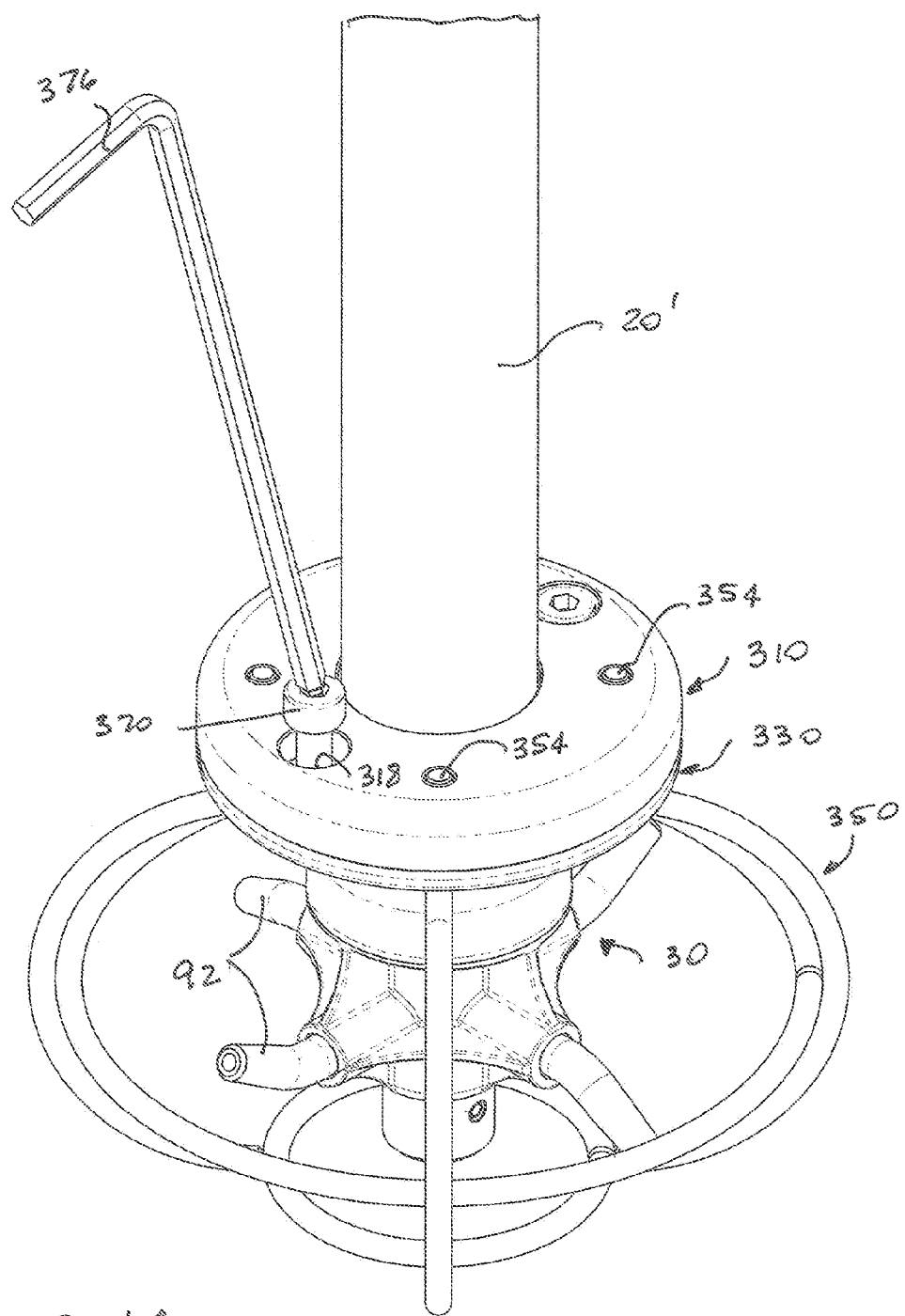
FIG. 14 is a 3-D isometric view of the device of FIGS. 7-8, particularly illustrating a sixth assembly step.

First, the second disk shaped member 330 is attached to the second elongated member 80' in FIG. 9 or the first elongated member 20' is passed through the aperture 314 of FIG. 10, so that surfaces 311 and 33 are positioned for further direct contact therebetween. Next, in FIG. 11, the second elongated member 80' is threaded onto the threaded end of the first elongated member 20' and either hand tightened or an optional tool 376 is advantageously inserted through the ports 86 in the second elongated member 80' and is used to tighten the second elongated member 80'. Then, the body 30 is attached to the second elongated member 80' in FIG. 12. In FIG. 13, the straight portion 356 of the frame 350 are passed through the enlarged ends 340 of the slots 336 so as to align the grooves 358 with the thickness of the second disk shaped member 330 and frame 350 is rotated so that the grooves 358 are disposed within the curved portions 338 of the slots 336. Now, in FIG. 14, the first disk shaped member 310 is brought into abutting relationship with the second disk shaped member 330 so that the straight portions 356 penetrate the third apertures 318 and fasteners 370 are used to releaseably fasten the first disk shaped member 310 to the second disk shaped member 330. Now the apparatus (assembly) is ready for use in cleaning bag type filters (not shown), whereby the cage or frame 350 is first slid into the interior of the bag type filter (not shown) through the open end thereof and is advanced to the closed end thereof. It would be understood that additional sections of the first elongated member 20' would be used so that the cage of frame 350 will reach or come sufficiently close to the closed end of the bag type filter (not shown) or the first elongated member 20' may be provided as a flexible member, for example such as a hose, of a sufficient length. The fluid pressure is then delivered through the nozzles 92 onto the interior surface of the bag type filter (not shown) either during insertion or retraction motion of the cage of frame 350 or both until the cleaning operation is terminated. The bag filter (not shown) may be placed onto a ground surface for ease of cleaning. Advantageously, the frame 350 provides a separation between the end of nozzles 92 and the interior surface of the bag filter (not shown) and prevents undesirable contact therebetween, that would destroy operability of the apparatus.

The instant invention also contemplates that the nozzles 92 may be installed after the body 30 has been placed within the hollow interior of the frame 350 through the openings provided in the wall thereof.

Preferably, the spacing between the straight portions 356 is sufficient to allow ease of passage of the body 30 during assembly, although such body 30 may be angled during insertion to take advantage of the openings 355 in the wall of the frame 350.

Figure 15:
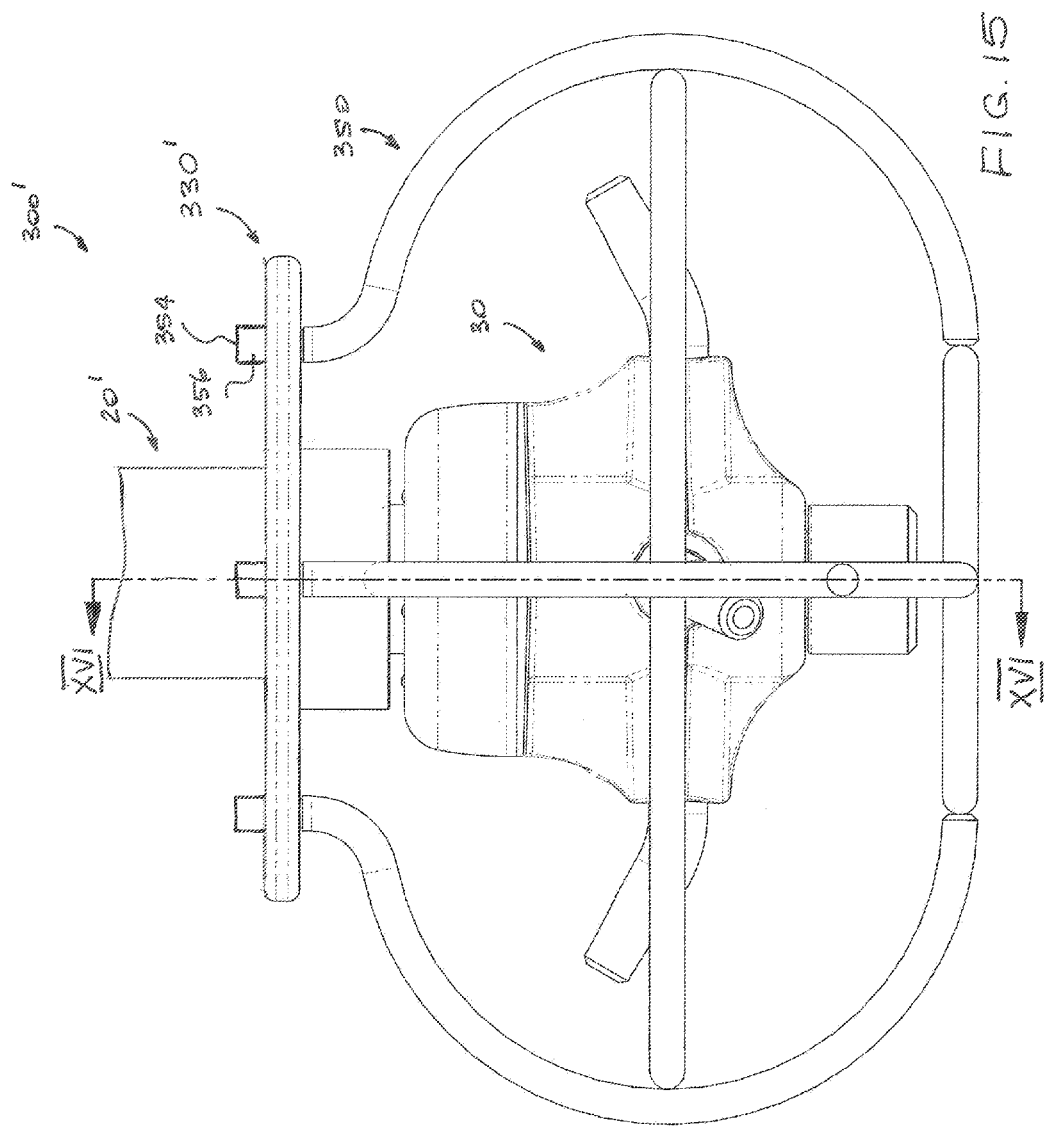
FIG. 15 is an elevation view of the device of FIG. 3, particularly illustrating the rotating body of FIGS. 23-24 and constructed in accordance with one form of the invention.
Figure 16:
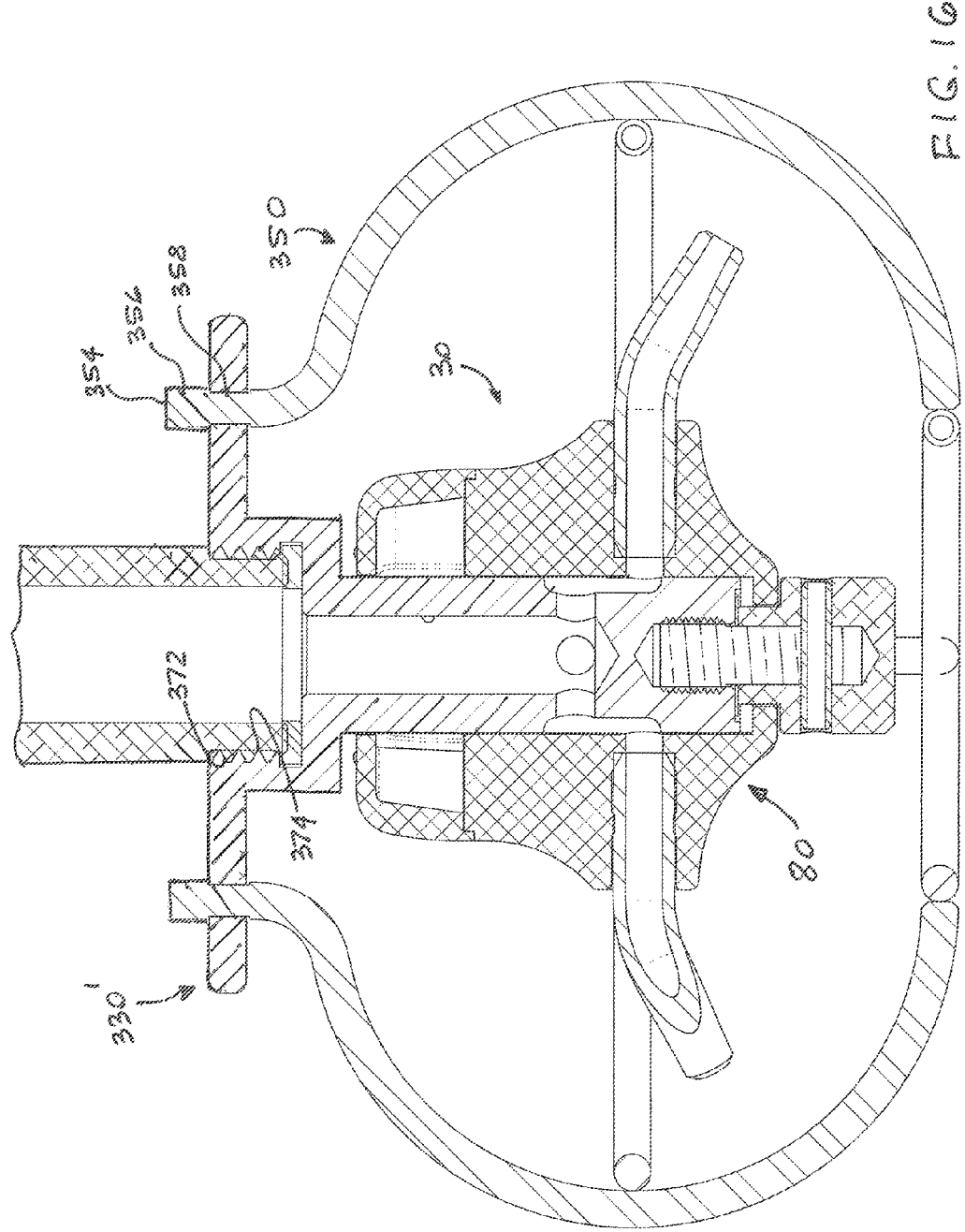
FIG. 16 is a cross-sectional elevation view of the device of FIG. 15 along lines XVI-XVI.

FIGS. 15-16 illustrate an alternative form of the device, generally designated as 300', of FIGS. 1-8, wherein the second disk shaped member 330' is provided integral with the second elongated member 80' so that the combination is threaded directly onto the threaded end of the first elongated member 20'. The width of the groove 358 is selected so as to provide a gripping effect when the frame or cage 350 is rotated so that the grooves 358 are positioned within the curved portions 338 of the slots 336. By gripping effect it is to be understood that a friction results between the surfaces of the disk shaped member 330' and edges of the groove 358, wherein the friction is sufficient to prevent disengagement of the frame or cage 350' from the disk shaped member 330' during operation. If required the above described tool 376 can be utilized to increase torque while rotating the frame 350' after engagement with the disk shaped member 330'. It is also contemplated that one or both surfaces of the disk shaped member 330' may be provided with a small abutment (not shown) that would facilitate the gripping effect. Alternatively, the width of the curved slot portion 338 can be made progressively smaller so that the gripping effect will be caused by the friction between the surface of the groove 358 and the width of the curved slot portion 338. It would be appreciated that the first disk shaped member 310 is eliminated in this form of the device 300'.

Figure 17:
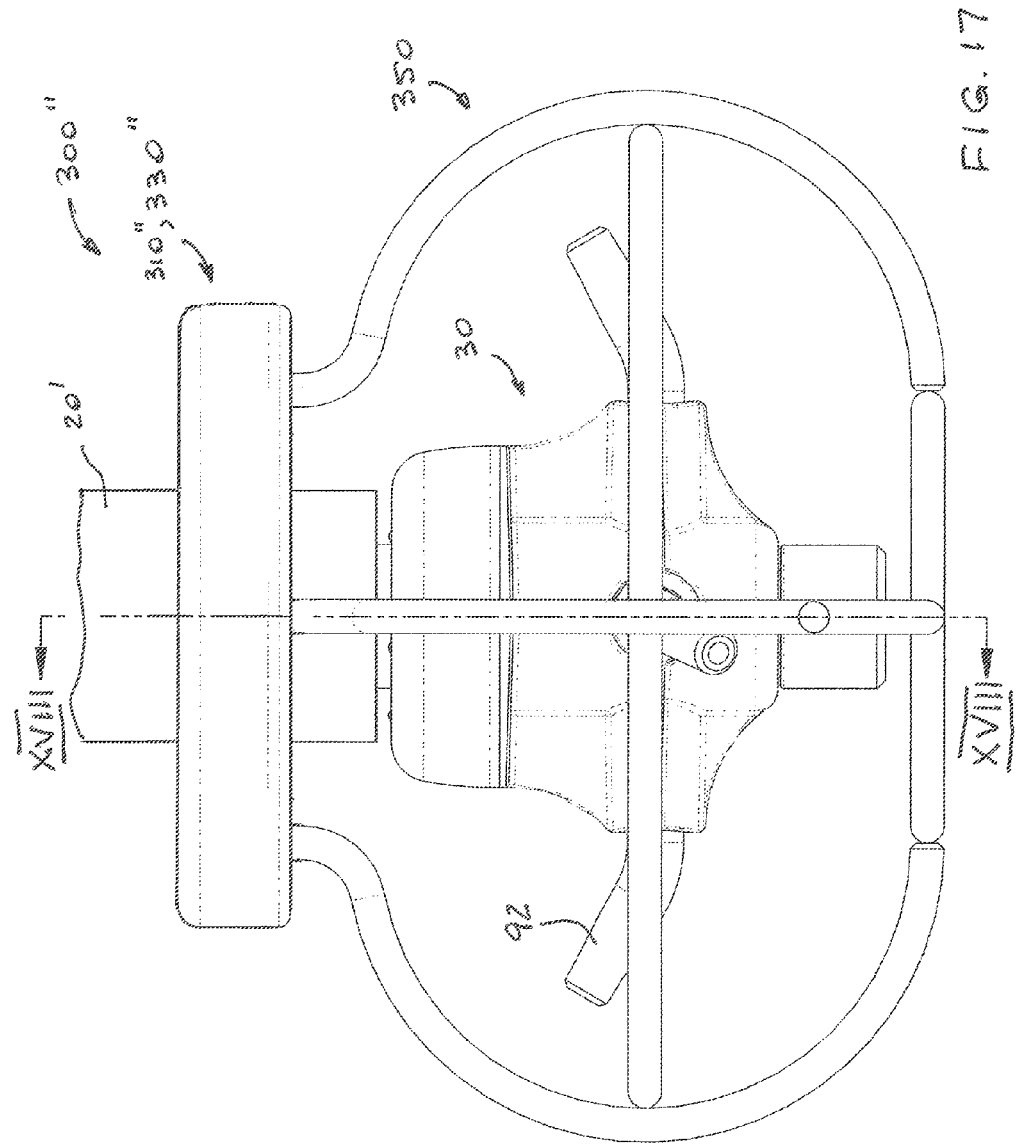
FIG. 17 is an elevation view of the device of FIG. 3, constructed in accordance with another form of the invention.
Figure 18:
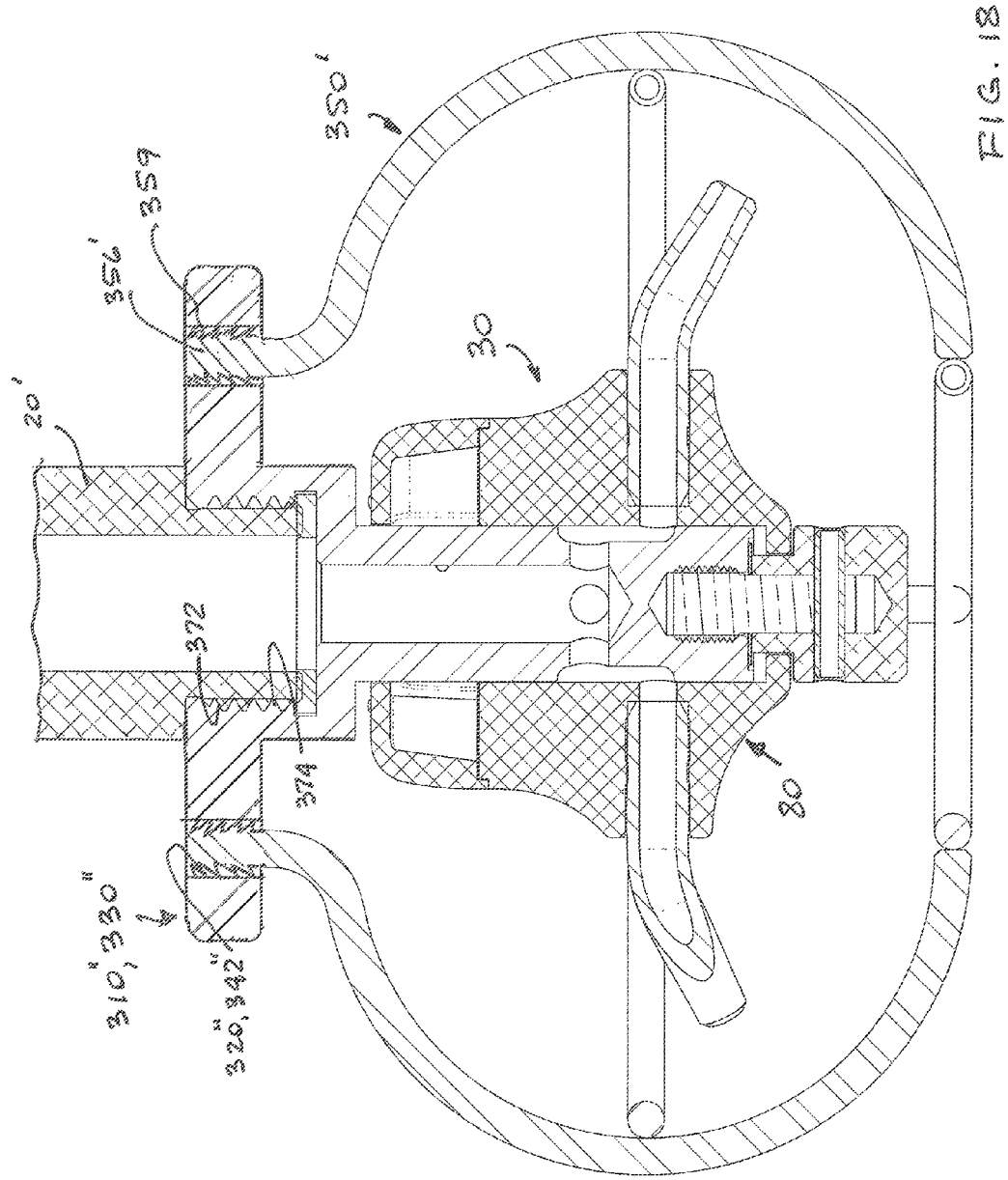
FIG. 18 is a cross-sectional elevation view of the device of FIG. 17 along lines XVIII-XVIII.

FIGS. 17-18 illustrate another alternative form of the device, generally designated as 300", of FIGS. 1-8, wherein either the first or second disk shaped member, 310" or 330" is provided integral with the second elongated member 80' so that the combination is threaded directly onto the threaded end of the first elongated member 20'. The groove 358 is replaced with a gripping element, such as barbs 359 on the surface of the straight portion 356' so as to provide a friction fit with either apertures 320" of the first disk shaped member 310" or apertures 342" of the second disk shaped member 330". It would be appreciated that slots 336 are no longer required in this form of the device 300".

Although the first disk shaped member 310, 310" or the second disk shaped member 330, 330' and 330" have been illustrated as being releaseably attached to the first elongated member 20', the instant invention contemplates that such disk shaped members may be permanently attached to the first elongated member 20' by way of welding, clamping, crimping, adhesives or any other suitable conventional attachment means and may be even integrally formed therewith, particularly, in forms of FIGS. 15-18. Furthermore, the instant invention also contemplates that the first and second disk shaped members may be provided for example as having a square or a hexagonal cross-section in a plane normal to the longitudinal axis 301.

FIG. 19 illustrates yet another alternative embodiment, wherein a disk shaped member, generally designated as 349, is either permanently or releaseably attached to the first elongated member 20' and wherein the apertures 320 or 342 have been adapted so as to pass straight portions 356''' of the cage or frame 350''' having an external thread 357 formed thereon so that the cage 350''' may be fastened to the disk shaped member 349 with conventional nut fasteners 374. Grooves 358 may be also provided in combination with curved slots 336 or the thickness of the disk shaped member 349 may be selected to take advantage of the bend between the straight portion 356''' and curved portion 352''' of the frame 350'''.

Yet alternatively, the thickness of the straight portion 356 can be enlarged so as to allow for a threaded aperture (not shown) to be provided within the thickness of the straight portion 356 so that the frame 350 can be fasten to the mounting member with threaded male fasteners passed through apertures 320 and allowing elimination of the second disk shaped member 330.

It is further contemplated that straight portions 356 may be configured and/or positioned for direct abutment with an exterior surface of the first elongated member 20' and be secured thereto for with a clamp, for example used on hoses, or any other suitable clamping means so that the frame is at least temporarily secured to the first elongated member 20'.

Now in reference to FIGS. 20-22, therein illustrated another embodiment of the device, generally designated as 400, configured to clean bag type filters (not shown). The device 400 includes a mounting member, generally designated as 410, having a body 412 with an axial aperture 414 sized and shaped to receive the exterior surface of the first elongated member 20 of the apparatus 10 therethrough. The device 400 further includes a cage or frame 420 sized and shaped to be inserted into the interior of the bag filter (not shown). It is contemplated that the bag filter (not shown) may be disposed on the frame 420 either loosely, in a general abutting relationship or in a stretched manner.

Thus, in the device 400, the mounting member 410 is permanently attached to the frame 420 and each of the frame 420 and the mounting member 410 is defined by two halves joined together by a hinge 442 so as to move between an open position of FIGS. 21-22, wherein the pair of halves are pivoted away from each other and a closed operating position wherein the pair of halves are pivoted into abutting relationship with one another of FIG. 20.

The hub 410 may be configured for fixed attachment to the first elongated member 20, for example by way of adhesives, clamps and the like means or may be even formed integral therewith, for example by molding or casting process.

However, it is presently preferred to releaseably attach the body 412 onto the first elongated member 20 so as to use the cleaning apparatus for different bag filter types. Accordingly, the body 412 and the frame 420 are provided as a pair of halves joined by a hinge 442, as best shown in FIGS. 22-23. The body 412, which is essentially a disk shaped member defined by a pair of C-shaped members when the halves are in the closed operating condition, also has an interior groove 416 sized to operatively engage with the above described flange 86 or any other protrusion (not shown) on the exterior surface of the first elongated member 20.

An optional bore 413 may be also formed in the interior surface of the disk shaped body 412.

An aperture 418 may be provided in each ridge 417 upstanding on a surface of the body 412 so as to receive fastener therethorugh, for example such as bolt, pin or any other suitable fastener (not shown). Another aperture 419 may be also provided to receive a thin elongated pin (not shown) therethrough.

The frame 420 is shown as being defined by first members 424, whose thickness define a wall thickness of the frame 420. At least one second member or brace 426 may be disposed generally normal to first members 424 and being rigidly attached thereto.

Another disk shaped member 430, defined by a pair of C-shaped or half-ring members, with an aperture 432 may be also provided or members 424 may be joined, at their ends, in the location of the disk shaped ring 430.

The installation method of the device 400 onto the elongated member 20 or 20' includes the step of opening the halves of the devices 400 and then closing them to cage the peripheral flange 86 within the groove 416 which is sized accordingly and securing the halves accordingly with fasteners (not shown), although a conventional snap-type arrangement is also contemplated.

The method of using the device 400 is the same as the method of using the device 300.

Furthermore, either the device 300 or 400 may be configured to attach to the device of FIG. 25, which is essentially FIG. 2 of a U.S. Pat. No. 6,588,057 to McMahon, whose teachings are incorporated herein by reference thereto. Essentially, either device 300 or 400 may be employed in combination with presently available devices, utilizing air and/or liquid as a cleaning agent, that provide either an elongated portion, such as a hose or handle and/or heads or protrusion to operatively mate with above described mounting member 410 or disks 310 and 330.

Either frame 350 and 420 is preferably manufactured from Plastic, although metals and combinations are contemplated by the instant invention. It would be understood that the frame 420 is particularly suited for a molding process which will advantageously produce the hinge 442.

Although the frames 350 and 420 have been shown as cage type members, a frame manufactured from a mesh type material or even from a perforated material is also contemplated depending on the application. Furthermore, either frame 350 and 420 may be configured as an elongated cylinder. It is not necessary to provide the above described mounting member 410 or disks 310 and 330 and a simple flange or sleeve at the end of the frame 350 and 420 is contemplated to be sufficient for attachment to an elongated member, for example by way of a hose type clamp (not shown), as long as the body 30 can be inserted into a hollow interior of either frame 350 or 400.

Thus, in one embodiment, the invention comprises a member including a hollow tubular member 20' having an external thread 372 on one end thereof and a nozzle assembly 30 threadably connected to the one end of the hollow tubular member 20' and mounted for rotation about axis thereof, the nozzle assembly 30 having a hollow interior in communication with an interior of the hollow tubular member 20' and defining a peripheral flange 86 disposed normal to the axis, wherein the mounting member is configured to cage the peripheral flange 86 and is further configured to be releaseably or permanently attached to a frame having the nozzle assembly 30 disposed within a hollow interior thereof.

In another embodiment, the invention provides a device comprising a hollow tubular member 20, 20' having an external thread 372 on one end thereof; a nozzle assembly 30, 92 threadably connected to the one end of the hollow tubular member 20, 20' and mounted for rotation about axis thereof, the nozzle assembly 30, 92 having a hollow interior in communication with an interior of the hollow tubular member 20, 20' and defining a peripheral flange 86 disposed normal to the axis; a frame 350, 420 having a hollow interior defining a wall of the frame and apertures or openings formed through a thickness of the wall so that the hollow interior of the frame 350, 420 is in open communication with an environment external to the frame, wherein the rotating nozzle assembly 30, 92 is positioned within the hollow interior of the frame 350, 420; and a mounting member 302, 410 configured to cage the peripheral flange 86 and is further configured to be releaseably or permanently attached to the frame 350, 420.

In yet another embodiment, the invention provides a mounting member either releaseably or permanently attached to an exterior surface of an elongated member and having apertures formed through a thickness thereof; a frame having a hollow interior, openings formed through a wall thickness thereof so as to positioned the hollow interior in open communication with an external environment and straight portions adapted with barbs so as to frictionally engage apertures in the mounting member; and a rotating nozzle assembly mounted within the hollow interior of the frame and in fluid communication with a hollow interior of the elongated member so as to deliver fluid flow into the external environment.

In a further embodiments, the invention provides a mounting member either releaseably or permanently attached to an exterior surface of an elongated member and having apertures formed through a thickness thereof and a frame having a hollow interior, openings formed through a wall thickness thereof so as to positioned the hollow interior in open communication with an external environment and straight portions adapted with external threads so as to pass through apertures in the mounting member for engagement with threaded fasteners; and a rotating nozzle assembly mounted within the hollow interior of the frame and in fluid communication with a hollow interior of the elongated member so as to deliver fluid flow into the external environment.

In yet a further embodiment, the invention provides a mounting member either releaseably or permanently attached to an exterior surface of an elongated member and having curved slots formed through a thickness thereof; a frame having a hollow interior, openings formed through a wall thickness thereof so as to positioned the hollow interior in open communication with external environment and straight portions adapted with grooves so as to interlock with the slots in the mounting member; and a rotating nozzle assembly mounted within the hollow interior of the frame and in fluid communication with a hollow interior of the elongated member so as to deliver fluid flow into the external environment.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A device configured to be used with a nozzle assembly for cleaning an air filter, comprising:
   a. a frame comprising a plurality of members spaced apart from each other, each from said plurality of members comprising an outwardly curved portion, all curved outwardly portions of said plurality of members defining a spherical shape of said frame with a hollow interior and openings formed through a wall thickness of said frame so that said hollow interior is in open communication with an interior surface of the air filter when the air filter is positioned over an exterior surface of said frame during use thereof, said hollow interior configured to receive the nozzle assembly;
   b. a mounting member configured to be releaseably or permanently attached to one end of said frame and is further configured to be releaseably or permanently attached to another member; and
   c. a brace joining all curved portions of said plurality of members.

2. The device, according to claim 1, wherein said each from said plurality of members further including a first end joined to a first end of remaining members, a free second end, a straight end portion disposed at a distance from and parallel to a longitudinal axis of said device, said straight end portion terminating in said free second end, a groove formed in said straight end portion proximal to said free distal end, said outwardly curved portion extending from said straight portion and terminating in said first end of said each from said plurality of members, wherein all straight portions are configured to interlock with said mounting member so that said mounting member is releaseably attached to said frame.

3. The device of claim 2, wherein said frame further includes a ring shaped member attached directly to all first ends of said plurality of members.

4. The device, according to claim 1, wherein said mounting member comprises:
a first disk shaped member including:
a first aperture formed through a thickness thereof and having an axis aligned with said longitudinal axis of said device,
a pair of diametrically opposite second apertures formed through said thickness, each positioned in a region between an edge of said center aperture and a peripheral edge of said first disk shaped member,
a plurality of third apertures formed through said thickness in a spaced apart relationship with each other, each positioned in said region between said edge of said center aperture and said peripheral edge of said first disk shaped member, and
a bore formed in one surface of said first disk shaped member coaxially with said first aperture; and
a second disk shaped member including:
one surface thereof positioned in a direct abutting contact with said one surface of said first disk shaped member during use of said device,
a first aperture formed through a thickness of said second disk shaped member and having an axis thereof aligned with said longitudinal axis of said device,
a pair of threaded second apertures formed through said thickness of said second disk shaped member and aligned with said pair of second apertures formed through said thickness of said first disk shaped member, whereby a pair of threaded fasteners passed through said second apertures of said first disk shaped member and threadably engaging said second apertures of said second disk shaped member releaseably fasten said second disk shaped member to said first disk shaped member, and
plurality of curved slots formed through said thickness of said second disk shaped member, each having an enlarged end aligned, during use of said device, with a respective third aperture of said first disk shaped member when said second disk shaped member is releaseably fastened to said first disk shaped member.

5. The device, according to claim 4, wherein said bore is configured to receive a flange on the another member when said second disk shaped member is fastened to said first disk shaped member, whereby said device is being releaseably attached to the another member.

6. The device, according to claim 1, wherein said mounting member is permanently attached to said frame and wherein each of said frame and said mounting member is defined by two halves joined by a hinge to move between an open position wherein said two halves are pivoted away from each other and a closed operating position wherein said two halves are pivoted into abutting relationship with one another.

7. The device, according to claim 6, wherein each half includes:
a plurality of members, each member including a first end joined to a first end of remaining members, a second end, and a curved portion disposed between said first and second ends of said each member;
a first C-shaped member joining first ends of said plurality of members;
a second C-shaped member having one end thereof joining second ends of said plurality of members;
a groove formed in an interior surface of said second C-shaped member;
a bore formed in said interior surface of said second C-shaped member and in said one end thereof;
a pair of ridges upstanding on an exterior surface of said second C-shaped member;
a first aperture formed through a thickness of a first ridge;
a second aperture formed through a thickness of a second ridge;
wherein a pair of first C-shaped members form a first disk shaped member when said halves are in said closed operating condition;
wherein a pair of second C-shaped members form a second disk shaped member when said halves are in said closed operating condition; and
wherein a first aperture in one first ridge is aligned with a second aperture in one second ridge.

8. The device of claim 1, further comprising said another member and said nozzle assembly, said another member including a hollow tubular member having an external thread on one end thereof, said nozzle assembly threadably connected to said one end of said hollow tubular member and mounted for rotation about axis thereof, said nozzle assembly having a hollow interior in communication with an interior of said hollow tubular member and defining a peripheral flange disposed normal to said axis, wherein said mounting member is configured to cage said peripheral flange.

9. A device configured to be used with a nozzle assembly for cleaning an air filter, comprising:
d. a first hollow tubular member having an external thread on one end thereof;
e. a second hollow tubular member comprising a hollow interior, a peripheral flange on one end thereof, a threaded bore in said one end and a plurality of orifices formed through a wall of said second hollow tubular member mediate ends thereof and in a communication with said hollow interior, said threaded bore configured to threadeably receive said external thread of said first hollow tubular member;
(c) a nozzle assembly connected to said second hollow tubular member and mounted for a rotation about a longitudinal axis thereof, said nozzle assembly having a hollow interior in a communication with said hollow interior of said second hollow tubular member;
(d) a frame comprising a plurality of members spaced apart from each other, each from said plurality of members comprising an outwardly curved portion, all outwardly curved portions of said plurality of members defining a spherical shape of said frame with a hollow interior and openings formed through a wall thickness of said frame so that said hollow interior is in open communication with an interior surface of the air filter when the air filter is positioned over an exterior surface of said frame during use thereof, wherein said rotating nozzle assembly is positioned within said hollow interior of said frame; and
(e) a mounting member configured to cage said peripheral flange and is further configured to be releaseably or permanently attached to said frame.

10. A method for cleaning a bag filter, comprising:
f. providing a frame comprising a plurality of members spaced apart from each other, each from said plurality of members comprising an outwardly curved portion, all outwardly curved portions of said plurality of members defining a spherical shape of said frame with a hollow interior and openings formed through a wall thickness of said frame so that said hollow interior is in open communication with an interior surface of the air filter during use of said frame;

g. mounting, with a mounting member, said frame onto a member configured to pass fluid flow therethrough;
h. mounting a nozzle assembly within a hollow interior of said frame in a fluid communication with said member configured to pass fluid flow therethrough;
i. inserting said frame with said nozzle assembly therewithin into an interior of the bag filter;
j. rotating said nozzle assembly with said fluid flow; and
k. directing, with nozzles of said nozzle assembly, said fluid flow through said apertures in said frame onto the interior surface of the bag filter.

11. The device of claim 1, wherein said mounting member comprises a plurality of apertures formed in a spaced apart relationship though a thickness thereof and wherein said frame comprises a plurality of members spaced apart from each other to define said openings, each member including a first end joined to a first end of remaining members, a free second end, a straight end portion disposed at a distance from and parallel to a longitudinal axis of said device, said straight end portion terminating in said free second end, barbs on said straight end portion proximal to said free distal end, said barbs being configured to frictionally engage a respective one of said plurality of apertures, and an outwardly curved portion extending from said straight portion and terminating in said first end of said each member, wherein all straight portions are configured to interlock with said mounting member so that said mounting member is releaseably attached to said frame.

12. The device of claim 1, wherein said mounting member comprises a plurality of apertures formed in a spaced apart relationship though a thickness thereof and wherein said frame comprises a plurality of members spaced apart from each other to define said openings, each member including a first end joined to a first end of remaining members, a free second end, a straight end portion disposed at a distance from and parallel to a longitudinal axis of said device, said straight end portion terminating in said free second end and passed through a respective one of said plurality of said apertures during use of said device, a thread on said straight end portion proximal to said free distal end and extending past an exterior surface of said mounting member, said thread is configured to receive a threaded fastener, and an outwardly curved portion extending from said straight portion and terminating in said first end of said each member, wherein all straight portions are configured to interlock with said mounting member so that said mounting member is releaseably attached to said frame.

13. The device of claim 1, wherein said mounting member comprises a pair of members being fastened to each other during use of said device and configured to releaseably interlock with said one end of said frame.

14. The device of claim 1, wherein said frame comprises a mesh material.

15. A device configured to be used with a nozzle assembly, rotateable on a member with a flange, for cleaning a bag air filter, comprising:
a frame having a hollow interior defining a wall of said frame and openings formed through a thickness of said wall so that said hollow interior is in open communication with an interior surface of the air filter during use of said frame, said frame comprising:
a plurality of members spaced apart from each other to define said openings, each member including a first end joined to a first end of remaining members, a free second end, a straight end portion disposed at a distance from and parallel to a longitudinal axis of said device, said straight end portion terminating in said free second end, a groove formed in said straight end portion proximal to said free distal end, and an outwardly curved portion extending from said straight portion and terminating in said first end of said each member, wherein all straight portions are configured to interlock with said mounting member so that said mounting member is releaseably attached to said frame, said hollow interior configured to receive the nozzle assembly,
a brace joining all curved portions of said plurality of members, whereby said all curved portions define a spherical shape of said frame, and
a ring shaped member attached directly to all first ends of said plurality of members;
a first disk shaped member comprising:
a first aperture formed through a thickness thereof and having an axis aligned with said longitudinal axis of said device,
a pair of diametrically opposite second apertures formed through said thickness, each positioned in a region between an edge of said center aperture and a peripheral edge of said first disk shaped member,
a plurality of third apertures formed through said thickness in a spaced apart relationship with each other, each positioned in said region between said edge of said center aperture and said peripheral edge of said first disk shaped member, each first aperture is configured to receive a straight portion of a respective member of said frame, and
a bore formed in one surface of said first disk shaped member coaxially with said first aperture, said bore shaped to receive the flange therewithin;
a second disk shaped member comprising:
one surface thereof positioned in a direct abutting contact with said one surface of said first disk shaped member during use of said device,
a first aperture formed through a thickness of said second disk shaped member and having an axis thereof aligned with said longitudinal axis of said device,
a pair of threaded second apertures formed through said thickness of said second disk shaped member and aligned with said pair of second apertures formed through said thickness of said first disk shaped member, and
a plurality of curved slots formed through said thickness of said second disk shaped member, each having an enlarged end aligned, during use of said device, with a respective third aperture of said first disk shaped member during use of said device;
a pair of threaded fasteners passed through said second apertures of said first disk shaped member and threadably engaging said second apertures of said second disk shaped member to releaseably fasten said second disk shaped member to said first disk shaped member; and
said first and second disk shaped members configured to releaseably cage the flange when being fastened with said pair of fasteners.

* * * * *